(12) United States Patent
Hofmann et al.

(10) Patent No.: US 11,988,004 B2
(45) Date of Patent: May 21, 2024

(54) METHOD FOR THE DISASSEMBLY OF TOWER OF A WIND POWER PLANT

(71) Applicant: Wobben Properties GmbH, Aurich (DE)

(72) Inventors: Jens Hofmann, Biederitz (DE); Jan Kapitza, Großefehn (DE)

(73) Assignee: Wobben Properties GmbH, Aurich (DE)

( * ) Notice: Subject to any disclaimer, the term of this patent is extended or adjusted under 35 U.S.C. 154(b) by 24 days.

(21) Appl. No.: 17/627,109

(22) PCT Filed: Jun. 15, 2020

(86) PCT No.: PCT/EP2020/066479
§ 371 (c)(1),
(2) Date: Jan. 13, 2022

(87) PCT Pub. No.: WO2021/008795
PCT Pub. Date: Jan. 21, 2021

(65) Prior Publication Data
US 2022/0251866 A1  Aug. 11, 2022

(30) Foreign Application Priority Data

Jul. 15, 2019 (DE) ...................... 10 2019 119 127.0

(51) Int. Cl.
*E04H 12/34* (2006.01)
*E04G 23/08* (2006.01)
(Continued)

(52) U.S. Cl.
CPC ......... *E04H 12/348* (2013.01); *E04G 23/081* (2013.01); *E04G 23/082* (2013.01);
(Continued)

(58) Field of Classification Search
CPC .......... F03D 13/20; F03D 13/00; F03D 80/00; F03D 80/50; F05B 2230/70;
(Continued)

(56) References Cited

U.S. PATENT DOCUMENTS 10,815,656 B2   10/2020  Kersten
2005/0129504 A1  6/2005  De Roest
(Continued)

FOREIGN PATENT DOCUMENTS

DE  102016106526 A1  10/2017
DE  102016113224 B3  11/2017
(Continued)

OTHER PUBLICATIONS

Bönisch et al., "Break & Sieve: Expert exchange on the end-of-life of wind turbines," *Climate Neutral*, 60 pages, Nov. 1, 2018, English machine translation for original German document "Brechen & Sieben Fachaustausch vu End-of-Life von Windenergieanlagen".
(Continued)

*Primary Examiner* — Moshe Wilensky
(74) *Attorney, Agent, or Firm* — Seed IP Law Group LLP

(57) ABSTRACT

A method for, in particular completely or partially, disassembling a tower of a wind power plant, comprising the following steps: selecting suitable disassembly measures as a function of the tower location and the tower characteristics; preparing the disassembly, in particular of the tower and optionally the surroundings; carrying out the disassembly; and transporting the disassembled tower away.

14 Claims, 36 Drawing Sheets

(51) Int. Cl.
 *E04H 12/12* (2006.01)
 *F03D 80/00* (2016.01)

(52) U.S. Cl.
 CPC ............ *E04G 23/084* (2013.01); *E04H 12/12* (2013.01); *F03D 80/00* (2016.05); *E04G 2023/087* (2013.01); *F05B 2230/70* (2013.01)

(58) Field of Classification Search
 CPC ........... F05B 2240/12; E04G 2023/087; E04G 23/081; E04G 23/082; E04G 23/084; E04G 23/08; E04H 12/12; E04H 12/348
 See application file for complete search history.

(56) References Cited

U.S. PATENT DOCUMENTS

| | | | |
|---|---|---|---|
| 2019/0293052 A1* | 9/2019 | Johnson | B29C 66/71 |
| 2020/0071949 A1 | 3/2020 | Yoshino et al. | |
| 2021/0123204 A1 | 4/2021 | Betz et al. | |

FOREIGN PATENT DOCUMENTS

| | | | |
|---|---|---|---|
| DE | 102016113227 B3 * | 12/2017 | |
| DE | 102016113227 B3 | 12/2017 | |
| DE | 102018107421 A1 | 2/2019 | |
| DE | 102019102688 A1 | 8/2020 | |
| DE | 102019116840 A1 | 12/2020 | |
| EP | 2253782 A1 | 11/2010 | |
| WO | WO 0034651 A1 | 6/2000 | |
| WO | WO 2014037421 A1 | 3/2014 | |
| WO | 2018/189852 A1 | 10/2018 | |

OTHER PUBLICATIONS

Binding, "Recycling of wind turbines—current—Procedure—Status Quo," *Veolia: CIO information event*, 11 pages, Nov. 19, 2018, English machine translation for original German document "Recycling von Windkraftanlagen—aktuelle—Verfahren—Status Quo".

Jahrbruch, "Natural Reserve in the Energy Transition," *Competence Center for Nature Conservation and the Energy Transition KNE gGmbH*, 194 pages, Apr. 2019, English machine translation for original German document "k19 Naturschutz in der Energiewende".

* cited by examiner

METHOD FOR THE DISASSEMBLY OF TOWER OF A WIND POWER PLANT

BACKGROUND

Technical Field

The invention relates to a method for, in particular completely or partially, disassembling a tower of a wind power plant.

Description of the Related Art

At the end of the service life of a wind power plant, in most instances after 20 to 25 years, or by virtue of decommissioning for other reasons, it can be necessary for a wind power plant to be deconstructed, and optionally even entirely deconstructed. This deconstruction is associated with a plurality of challenges. Specific aspects of the deconstruction of towers of wind power plants are described in applications DE 10 2019 102 688 and DE 10 2019 116 840.

The German patent and trademark office in the course of the priority application pertaining to the present application has searched the following prior art: DE 10 2016 113 224 B3, DE 10 2018 107 421 A1, "Brechen und Sieben Fachaustausch zu End-of-life von Windenergieanlagen" Fachagentur Windenergie an Land e.V., "K 19 Naturschutz in der Energiewende" Kompetenzzentrum Naturschutz und Energiewende KNE gGmbH, "Recycling von Windkraftanlagen—aktuelle Verfahren—Status Quo" CIO—Informationsveranstaltung ("Wrecking and Screening—Expert symposium pertaining to the end-of-life of wind power plants," Trade Agency Windenergie an Land e. V., "K 19 Environmental protection in the energy revolution" Center of Competence for Environmental Protection and Energy Revolution KNE gGmbH, "Recycling of Wind Power Plants—current methods—status quo" CIO—information event).

BRIEF SUMMARY

Provided is a method for completely or partially disassembling a tower of a wind power plant, said method enabling an improved deconstruction of wind power plants. Provided is a method for completely or partially disassembling a tower of a wind power plant, said method enabling a deconstruction of wind power plants which is more cost effective and/or safer and/or gentler on resources in comparison to existing solutions.

Provided is a method for, in particular completely or partially, disassembling a tower of a wind power plant, comprising the following steps: selecting suitable disassembly measures as a function of the tower location and the tower characteristics; preparing the disassembly, in particular of the tower and optionally the surroundings; carrying out the disassembly; and transporting the disassembled tower away.

Wind power plants currently have a service life of approx. 20 to 25 years. Once the end of the service life has been reached, or in the case of any other decommissioning, it is optionally desirable or even mandated by law that the wind power plants are completely or partially demolished. Reusable components here are preferably treated such that said reusable components can be reused. Components of wind power plants, after the deconstruction, can also be supplied to a recycling or disposal process. The deconstruction and the disassembly of wind power plants are not simple and typically have to be carried out by trained and skilled personnel with sufficient experience. The solution proposed here is not only able to be applied to towers of wind power plants but can preferably also be applied to other tower-like buildings.

The solution proposed here is based inter alia on the concept that for disassembling a tower of a wind power plant, suitable measures have to be selected as a function of the tower location and the tower characteristics. Various disassembly measures are highly suitable for towers with different characteristics and at different locations, but less suitable for other towers and/or at other locations. The consideration of the location and the characteristics of the tower are thus advantageous with a view to a safe and cost-effective disassembly.

The preparation of the disassembly serves in particular for achieving the preconditions for the disassembly. For example, the disassembly of a tower of a wind power plant can require that the area about the wind power plant is sufficiently secured and/or cordoned off, the electrical connections and cable conduits of the wind power plant are in a state that permits the disassembly, and/or the wind power plant to be disassembled is cut off from the power grid. Furthermore preferably, requirements in terms of occupational safety should be ensured and corresponding access possibilities, required tools, storage possibilities and auxiliary equipment be available.

Preferable preparatory procedures for disassembling a tower of a wind power plant can relate to installed components, rotor blades and/or the nacelle. The cables which as installed components are preferably in the tower and in the nacelle are removed, preferably by means of traction hoses which are fastened to winches. Furthermore preferably, the clamps are released from cables and cable holder rails that are to be released in the tower, and the cables are lowered in the tower. Removed cables can preferably be collected in containers. The cables of the E-module are preferably retracted into the lower plane of the E-module and are removed, preferably conjointly with the E-module, after or toward the completion of the disassembly of the tower. The earlier removal and collection of the cables has the advantage that the cables and optionally also cable clamps or other cable mountings can be reused or stripped down to the component parts thereof, cleaned, smelted and reused in a new application. Alternatively, the cables may also remain in the wind power plant and if required cut to pieces and disassembled conjointly with the tower.

The preparation of the disassembly preferably also comprises the removal of the drive part of the access aid from the winch before the voltage is switched off in the wind power plant. In order for the access aid to be uninstalled, the guide ropes are preferably released and lowered, and the elevator cage is uninstalled. The access aid can also be reused, for example, or optionally stripped down to the component parts thereof and thus be disposed of or reused in a new application.

If required for the further disassembly measures, the preparation of the disassembly can include the installation of a builders hoist instead of the access aid.

Further installations such as exhaust air hoses, banisters, handles, grids, side plates, consoles, nets, net brackets, hose mountings, elevator rope guides, elevator frames, cable holders, etc., are preferably removed in the course of the preparation of the disassembly and, as far as necessary, further stripped down and reused as far as possible or cleared away or disposed of, respectively. All vessels which include liquid are preferably sealed in the course of the preparation of the disassembly or emptied, and the liquid salvaged or disposed of in a manner corresponding to the type of said liquid.

The rotor blades of a wind power plant are preferably disassembled conjointly with the rotary head; otherwise the rotor blades are preferably individually removed from the wind power plant. To this end, the rotor is preferably locked. This may optionally be followed by further jobs such as, for example, the separating of split blades, the deconstruction of trailing edge segments, or the dismantling of the blade heating. The component parts of rotor blades are preferably separated as far as possible and salvaged. Comminuted rotor blades can preferably be used in the production of new rotor blades or used as fillers in specific plastics materials. An alternative possibility is the thermal recovery of said comminuted rotor blades as fuel in incinerators for power generation, or as fuel for the cement industry.

The rotor head per se can preferably also be reused or be disposed of. Cladding parts of aluminum, or castings and steel components can preferably be smelted and reused in a new application.

The disassembly of the generator and of the nacelle can also be advantageous in terms of the preparation of the disassembly of the tower of a wind power plant. Depending on the size and the crane technology available, the generator and the nacelle, in parts or as complete units, can be lashed to the crane and lowered. These components are also preferably reused, in particular upon reconditioning, or the component parts thereof are recycled or expertly disposed of.

These preferred procedures in the preparation of the disassembly preferably take place before the actual disassembly of the tower is carried out. Preferred possibilities for disassembling the tower will be described in more detail hereunder. Once the disassembly of the tower has taken place, the disassembled tower is transported away from the original tower location. This transporting away of the disassembled tower typically includes transporting away tower segments or comminuted tower segments or individual component parts or components.

The tower preferably comprises a foundation. In the present description, a foundation is preferably understood to be part of a tower of a wind power plant. The complete or partial disassembly of a tower of a wind power plant thus also comprises the complete or partial disassembly of the foundation.

The method described here for disassembling a tower of a wind power plant is preferably used for a tower which comprises prefabricated concrete units and/or site-cast concrete units. The tower can in particular be prestressed by externally and/or internally guided tendons. Adjacent tower segments can preferably be fully or partially connected in a materially integral and/or form-fitting and/or force-fitting manner. The connection of adjacent tower segments at horizontal interfaces can differ from the connection of the adjacent tower segments at vertical interfaces.

Towers which are largely composed of prefabricated concrete units and/or site-cast concrete units are in particular referred to as concrete towers for wind power plants. A concrete tower is typically assembled from segments. The segments can in particular be annular segments which are stacked on top of one another and are mutually adjacent at horizontal interfaces. Such annular segments are preferably constructed from sub-segments, in particular in the lower part of a concrete tower, said sub-segments at vertical interfaces being assembled so as to form a ring only on-site, i.e., at the construction site. These sub-segments at the vertical interfaces thereof are connected to one another by way of reinforced grout joints, for example, or screw connections which are inserted into preferably prefabricated screw casings (for example as described in the application DE 10 2016 106 526). Dividing the annular segments into sub-segments is in most instances required by virtue of the transport dimensions being restricted to annular segments. Depending on the variant of the tower, one or a plurality of steel sections can also be placed onto the upper end of a concrete tower.

The connection of the annular segments at the horizontal interfaces thereof takes place, for example, in that said annular segments are connected to one another in a materially integral manner, for example adhesively bonded, or are placed on top of one another dry, this potentially also being referred to as a system joint. Additionally, the annular segments which are stacked on top of one another are preferably prestressed or braced in the vertical direction by means of tendons. These tendons typically run either in cast tubular sleeves within the concrete segments (so-called internally guided tendons), or on the internal side of the tower (so-called externally guided tendons). The connection of the annular segments among one another, and also of the sub-segments that form an annular segment among one another, as well as the internal or external guiding of the tendons, has an effect on the measures suitable for disassembling the tower.

The method described here is preferably able to be used at one or a plurality of the following locations of wind power plants: open location, for example meadows or fields; forest location with limited available space; dyke location; location with utility lines such as, for example, gas lines, in the immediate vicinity; location with limitations as a result of denial of use of neighboring properties; nature reserve; drinking water protection zone; location with adjacent buildings; water-proximal location, for example with ditches, waterways, lakes in the immediate vicinity; mountainous location.

The method is furthermore preferably characterized by removing installed parts in the interior of the tower, and/or installing a work platform in the interior of the tower and/or outside the tower, in particular while utilizing fastening points which have preferably already been utilized also for assembling and/or on fastening points which have been newly established by core drilling, for example; and/or separating the tendons; and/or separating adjacent tower segments; and/or removing the upper tower segment, in particular by lashing to a disassembly crane and subsequent lifting, pivoting and lowering; and/or examining coatings of the tower and/or the components thereof; and/or removing coatings, in particular an environmentally harmful coating, in particular by means of a high-pressure water jet and/or an abrading installation as well as optionally a suction installation; and/or felling the tower, preferably by way of a notch cut on the tower base as well as optionally subsequent detonating; and/or comminuting tower segments; and/or separating the comminuted tower segments according to the component parts thereof.

To the extent that installed parts in the interior of the tower have not yet been fully or partially removed in the step of preparing the disassembly, described at the outset, it can be preferable for installed parts in the interior of the tower to be fully or partially removed in a further step. All installed parts in the interior of the tower are preferably removed prior to the disassembly of the tower, whereby lightning protection installations and/or the access ladder for safety reasons are preferably released and removed once the disassembly progresses to the respective next segment to be severed.

The installation of one or a plurality of work platforms preferably takes place on the respective upper end of the (remaining) tower as adapted to the progressing disassembly. A work platform can be disposed in the interior of the tower as well as outside the tower, in particular on the external circumference of the latter. Fastening points which have already been utilized also for the assembly are preferably used for the fastening of a work platform. Alternatively or additionally, newly established fastening points which can be produced by core drilling, for example, can be used.

The separating of tendons can comprise different measures, depending on whether the tendons are guided internally or externally, said measures yet to be described in more detail hereunder. Separating the tendons is preferable in order for the prestressing, or the bracing, respectively, of the concrete tower along the longitudinal axis to be cancelled and the disassembly of the tower, in particular the separation of adjacent tower segments, thus to be facilitated.

The separating of adjacent tower segments can comprise different measures depending on whether adjacent tower segments at the interfaces thereof are connected in a materially integral manner, for example, or said interfaces being a dry system joint, these different measures also being described in more detail hereunder.

A respective upper tower segment is preferably removed at the respective upper end of the tower (the latter corresponding to the progress of disassembly), wherein such an upper tower segment is preferably lashed to a disassembly crane, subsequently lifted, pivoted, and then placed on the ground in the vicinity of the wind power plant, for example. This step is particularly preferable when the disassembly of the tower comprises the disassembly of the individual tower segments which are potentially damaged but still present in the form of a component.

The examining and optional removing of coatings, in particular environmentally harmful coatings, of the tower and/or the components thereof serves in particular to ensure that no emissions, or only minor emissions which are in particular below critical values, are created as a result of the disassembly of the tower.

The disassembly of the tower can also comprise the felling of the tower. This can preferably take place by way of a notch cut on the tower base. The tower here, preferably substantially as an entity but at least as the part above the notch cut on the tower base, is felled from the vertical to the horizontal. The further disassembly of the felled tower then takes place on the ground, or close to the ground, respectively. For example, a tower thus felled can subsequently be detonated or otherwise comminuted and transported away.

The tower segments of the tower are preferably comminuted and furthermore preferably separated according to the component parts thereof, so as to enable said tower segments to be reused, recycled and/or disposed of. The comminution of tower segments can take place while the tower segments still form the tower, for example in that the tower segments by means of a demolition tool are gradually comminuted from the top to the bottom on the existing tower. The comminution of tower segments can also take place on the ground, for example once entire tower segments have been removed from the tower and placed on the ground.

According to a preferred embodiment of the method it is provided that the separating of the tendons comprises: separating internally guided tendons by means of a thermal method and/or an oxygen lance and/or a high-pressure water jet.

A thermal separation of the tendons here can take place in particular by way of oxygen lances, for example. In the thermal separation by means of oxygen lances (the latter also potentially being referred to as oxygen core lances), the iron of the oxygen lance in the form of the casing tube and core wires at the lance tip is burnt. Furthermore preferably, a pressurized flow of pure oxygen is supplied through the lance here such that operating temperatures between 2000° C. and 2500° C. can be created. Metallic and mineral materials can be brought to melt at these temperatures.

Thermal drilling can preferably be carried out in mineral and metallic materials, wherein no progressive cutting procedure takes place but rather a plurality of successive drill holes represents a separating perforation. The individual tendons are preferably completely or at least largely severed by the thermal drill holes. The webs which remain in the separating method in most instances have a brittle glass structure and can be easy to separate, in particular in the case of mineral materials.

After such a separation of internally guided tendons and a corresponding weakening of the material situated between the two drill holes by embrittlement, the entire cross section is thus weakened, and the tower segments can subsequently be preferably released from one another by means of splitting apparatuses, for example. When separating internally guided tendons, a lateral work platform which may be disposed on the interior of the tower or outside the tower, in particular on the external circumference of the latter, is preferably used.

According to a further preferred embodiment of the method it is provided that the separating of the tendons comprises: relaxing externally guided tendons; and/or separating externally guided tendons, in particular on the tower top or on the tower base; and/or pulling off and optionally winding up externally guided tendons, in particular by means of a drum-reeling apparatus.

In the case of externally guided tendons, it is preferable for the latter to be relaxed prior to separation. This has the advantage that any uncontrolled lashing of the tendons upon separation can be avoided or at least reduced. A solution which is described in application DE 10 2019 102 688 can be used for relaxing externally guided tendons, for example. It is furthermore preferable for the separating of externally guided tendons to be performed at an increased operational safety level, independently of whether or not the tendons have been previously relaxed. A solution with an increased operational safety level for separating externally guided tendons is described in application DE 10 2019 116 840, for example.

After separating externally guided tendons it can be preferable for the latter to be pulled off and optionally wound up. The pulling off can in particular take place toward the top, i.e., toward the tower top, or toward the bottom, i.e., toward the tower base. A drum-reeling apparatus is preferably used for winding up the tendons. For example, a tendon lowering apparatus by way of which the tendons during the erection of the tower are lowered from above the tower top down to the tower base can be used as such a drum-reeling apparatus, for example. Such a tendon lowering apparatus serves for receiving and transporting tendon drums and typically comprises an apparatus frame, a switch cabinet, and a drive. The winding up of the externally guided tendons by means of such a drum-reeling apparatus has the advantage that the tendons are thus compactly stowed and able to be easily transported.

According to a further preferred embodiment it is provided that the separating of adjacent tower segments, in particular at horizontal joints, takes place while using a concrete wall saw and/or a pad saw and/or a wire saw and/or an oxygen lance and/or a high-pressure water jet and/or an, in particular hydraulic, splitting apparatus.

The separating of adjacent tower segments is in particular relevant when adjacent tower segments, in particular at horizontal and/or vertical joints, are fully or partially connected in a materially integral and/or form-fitting and/or force-fitting manner. The separating of adjacent tower segments is particularly preferable when lifting and removing of entire tower segments is to take place after the tendons have been separated.

Should a form-fitting connection be one which is composed of only a connection by abutment or stacking and which, optionally after the tendons have been separated, can be released by simply lifting up the upper tower segment, the separating of such adjacent tower segments is typically also already performed by lifting the one tower segment from the other. Further measures may be required in particular in the case of materially integral and/or force-fitting connections. To this end, the above-mentioned tools can in particular be used in order for these connections between the adjacent tower segments to be cancelled, in particular by severing or otherwise weakening material along joints. The separating of adjacent tower segments here can take place at joints which were created when assembling prefabricated concrete units, for example. The separating of adjacent tower segments can however also take place at any other location and also include the severing of components which were originally provided as prefabricated concrete units, for example.

Water with additive abrasive materials as a blasting means is preferably used in high-pressure water jet cutting. This blasting means is preferably accelerated by a high-pressure pump, guided by way of one or a plurality of special jet nozzles and directed onto the surface to be penetrated. Pressures of up to 4000 bar are preferably achieved here. The material on the surface of the component can be subtracted as a result of the high-impact energy, wherein the released material preferably flows off together with the blasting means. The use of abrasive materials herein preferably increases the cutting effect. A work platform is preferably used here. While separating, the joints between adjacent tower segments are preferably secured against unintentional subsiding of the segments using steel or timber chocks.

A preferably hydraulically controlled concrete wall saw and preferably a guide rail can take place, for example, for separating the uppermost concrete segment of a tower and the steel segment which lies above the latter and is conjointly braced with the latter, for example, this being particularly preferable because of the high accuracy that can be achieved using a concrete wall saw.

A pad saw as well as a wire saw can be used for mutually separating adjacent concrete segments, wherein the use of a pad saw is particularly preferable because of the higher accuracy of the latter. Furthermore, the cutting rate of a pad saw is relatively high. However, the tooling time for the frequent repositioning of the guide rails and the pad saw is long.

The wire saw in turn does have a lower cutting rate and is less accurate than the pad saw but instead is less complex in terms of the labor input and can also be assembled without a work platform, for example from the work cage of a crane. A wire saw is preferably fastened to one side of the tower. The wire is preferably a saw wire which is equipped with diamond fragments and is in particular placed completely about the tower and cuts into the concrete as a result of tension.

According to a further preferred embodiment it is preferable for the separating of adjacent tower segments, in particular at vertical joints, to take place by separating screw connections, in particular by destructive or non-destructive separating. When neighboring tower segments are connected by screw connections, for example at vertical or horizontal joints, the separating of such adjacent tower segments can particularly preferably take place by separating the screw connections. A non-destructive separating here can take place by releasing or unscrewing the screw connection, respectively. A destructive separating of such adjacent tower segments is also possible, for example by separating the screw connections using saws and/or oxygen lances and/or other tools and/or methods typically used for separating metal.

According to a further preferred embodiment the comminuting of tower segments takes place by means of detonating. The comminuting of tower segments can also take place by means of a ground-based demolition tool. A ground-based demolition tool can be, for example, a demolition excavator, in particular having a long front; an impact ball which can also be referred to as a wrecking ball; a cable excavator, or demolition shears. Demolition shears, which can also be referred to as a nibbling pocket, can preferably be used in combination with a demolition excavator or a cable excavator. The comminuting of tower segments can also take place by means of a tower-based demolition tool. A tower-based demolition tool can be, for example, a demolition robot, a walking excavator, or demolition shears. Demolition shears can preferably be used in combination with a demolition robot or a walking excavator.

The comminuting of tower segments can take place once the tower segments have already been mutually separated, or while two or more or all tower segments are still connected. For example, the comminuting of tower segments can take place by means of detonating wherein all tower segments or a majority of the tower segments of a tower are still connected to one another, for example as a still upright tower or as a felled tower.

The comminuting of tower segments by means of ground-based demolition tools can be used for tower segments which are still connected to one another as well as tower segments which have already been mutually separated. When using a demolition excavator, in particular having a so-called long front on which demolition shears are fastened to a telescopic arm, no crane and also no work platforms are typically required up to the operating height of the demolition excavator. Demolition shears preferably comminute the concrete and cut through the reinforcement. The comminuted component parts typically drop down on the inside and/or the outside of the tower such that the region about the tower has to be cordoned off over a large area for safety reasons. Tendons, in particular internally guided tendons, can optionally also be severed by demolition shears.

Also when using a cable excavator, no crane and also no work platform are required up to the operating height of the cable excavator. In the case of a cable excavator, demolition shears are in most instances fastened by way of a lattice boom and a hook block. The hydraulic connections typically required for the demolition shears can be guided by way of the lattice boom to the demolition shears, for example. As opposed to demolition shears which are fastened to a long front of a demolition excavator, the demolition shears of a cable excavator cannot be controlled in such a precise manner, this potentially resulting in longer demolition times. However, greater demolition heights are typically possible when using a cable excavator. For example, customary demolition heights with a demolition excavator having a long front are approx. 45 m while demolition heights of approx. 70 m may be possible when using a cable excavator. Cordoning off a comparatively large area about the tower is also required when using a cable excavator.

When an impact ball is used with a lattice boom crane, an impact ball is typically attached to the crane hook and deflected horizontally, preferably at a defined angle, by a second cable so as to then impact the tower. The concrete by virtue of the high weight of the impact ball is released from the reinforcement and is then loosened out of the tower piece by piece. As a result, pieces of the concrete tower with a length of approximately 8 to 10 m can be brought to topple, for example. Demolition heights of approx. 90 m are able to be reached by this procedure. This here is a particularly effective and cost-effective solution whereby cordoning off a large area about the tower is also required here.

When using tower-based demolition tools it is typically preferable for the tower segments to still form the tower and for a demolition tool to be placed on the top end of the tower. This demolition tool locally comminutes the tower segments successively from the top to the bottom wherein the tower-based demolition tool preferably moves downward as the disassembly of the tower progresses (and as the upper tower end continuously moves downward). This has the advantage that a crane or work platforms can typically be dispensed with. Furthermore, the emission of dust and/or noise here may be less in comparison to disassembly measures involving detonation or the use of saws.

It is preferable here for the tower-based demolition tool to be able to follow, preferably in a self-acting manner, the tower along the vertical axis of the latter. To this end, the tower-based demolition tool preferably has devices so as to be fastened in a self-acting manner to the towers which in most instances are conically tapered, and so as to be able to reach the upper end of the tower, in particular with or without the aid of a crane. This movement along the vertical axis, which initially takes place from the bottom to the top, can be achieved by various methods, for example by means of two or a plurality of chains or cables which are placed about the circumference of the tower and by means of a device are tensioned about the circumference and released in an alternating manner, and relocated in the vertical axis. As a result of such alternating bracing, the tower-based demolition tool holds its position on the existing tower, preferably by means of a friction-fit and/or a form-fit (in particular by virtue of the conical construction shape of the tower), and as a result of the second tensioning device, which is relocatable in the vertical axis, the tower-based demolition tool can move upward on the tower. It can be furthermore preferable for the vertical movement to be implemented by means of a mounting on or at the tower, in conjunction therewith to be impinged with a corresponding contact pressure, and drives following the contour of the tower. The mounting here preferably encompasses the circumference to an extent of more than 180°. A tower-based demolition tool at the beginning of the disassembly works thus preferably moves up to the upper rim of the tower and from there begins the comminution of the tower segments, for example by means of demolition shears or a demolition hammer. Controlling a tower-based demolition tool preferably takes place remotely by an operator on the ground by means of a secure data connection.

Further advantageous variants of embodiment of the method described above are derived by combining the preferred features discussed here.

BRIEF DESCRIPTION OF THE SEVERAL VIEWS OF THE DRAWINGS

Preferred exemplary embodiments will be described in an exemplary manner by means of the appended figures in which.

Identical elements, or elements which are substantially identical in terms of function, are provided with the same reference signs in the figures. General descriptions typically relate to all embodiments unless differences are explicitly stated.

DETAILED DESCRIPTION

Figure 1:
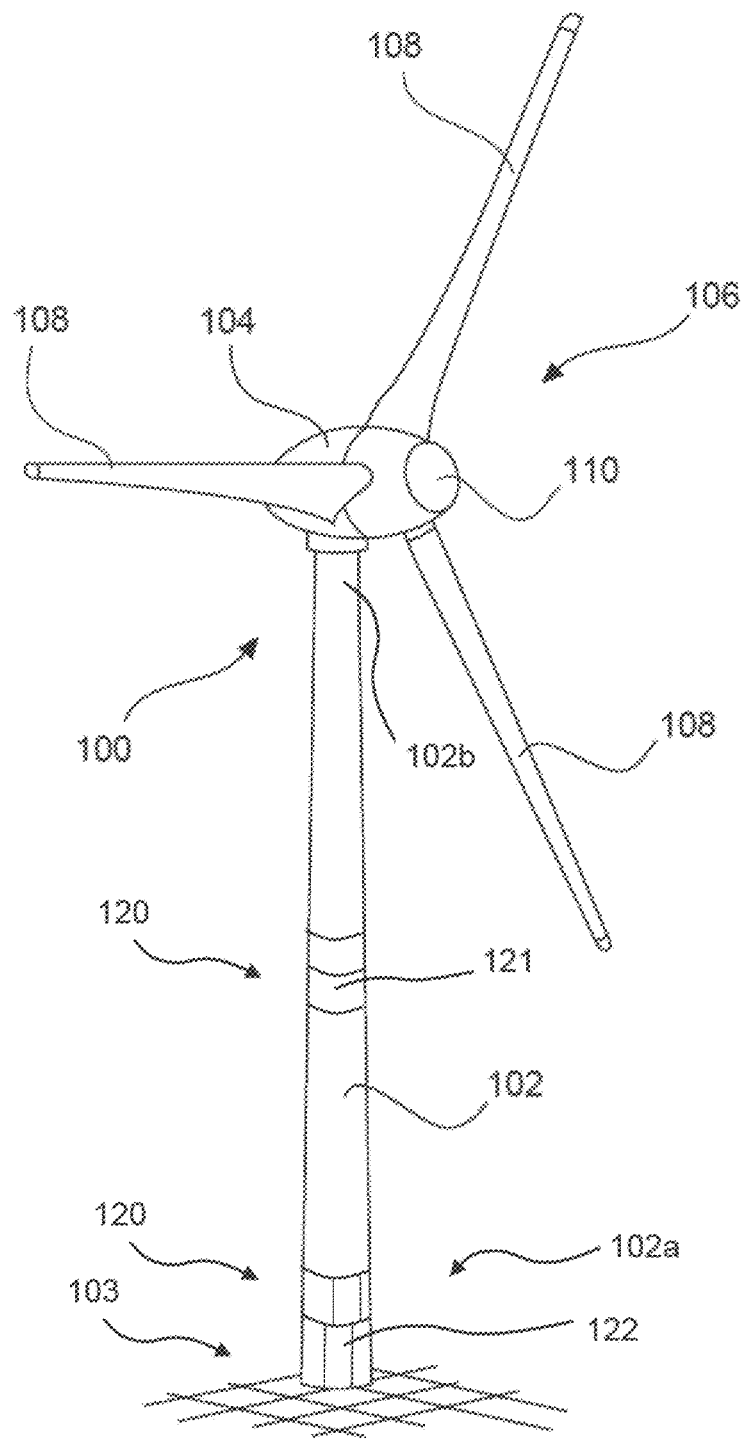
FIG. 1 shows a schematic illustration of an exemplary wind power plant.

FIG. 1 shows a schematic illustration of a wind power plant having a tower for disassembly according to the invention. The wind power plant 100 has a tower 102, disposed on a foundation 103, and a nacelle 104 on the tower 102. An aerodynamic rotor 106 having three rotor blades 108 and a spinner 110 is provided on the nacelle 104. The aerodynamic rotor 106 in the operation of the wind power plant is set in rotation by the wind and thus also rotates an electrodynamic rotor, or rotating part, of a generator which is coupled directly or indirectly to the aerodynamic rotor 106. The electric generator is disposed in the nacelle 104 and generates electric power. The pitch angles of the rotor blades 108 can be varied by pitch motors on the rotor blade roots of the respective rotor blades 108.

Figure 35:
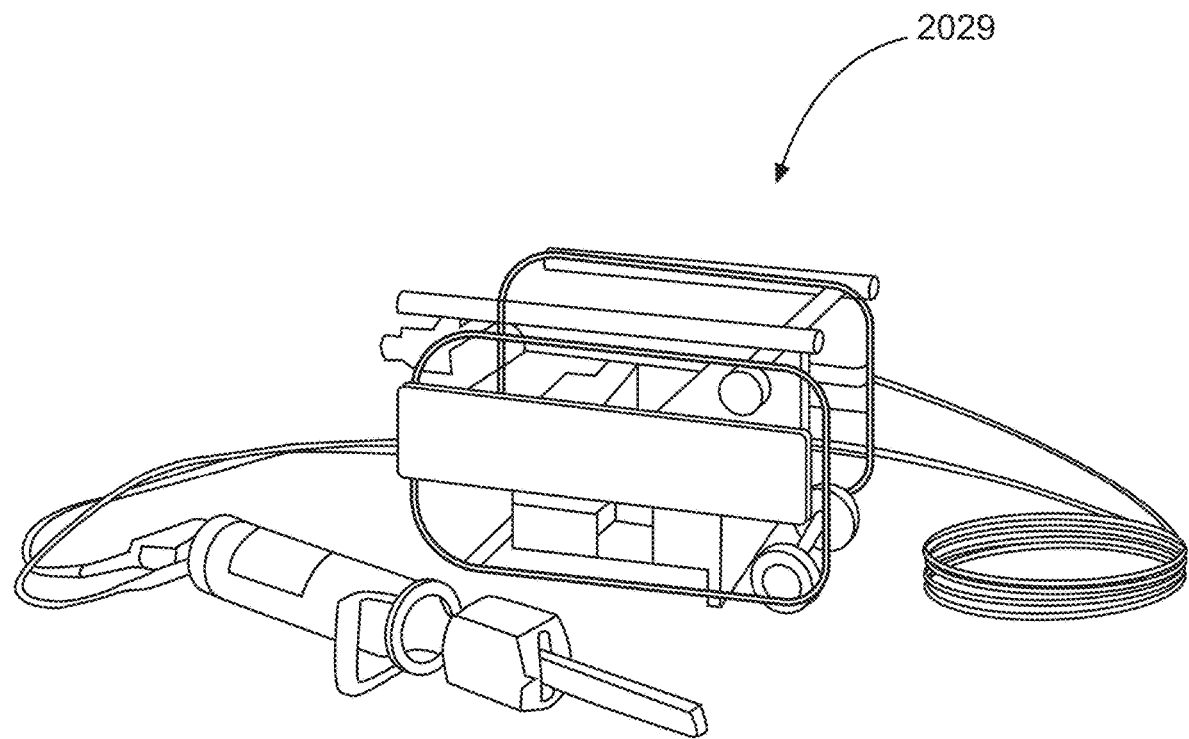
FIG. 35 shows a schematic three-dimensional view of an exemplary splitting apparatus.
Figure 36:
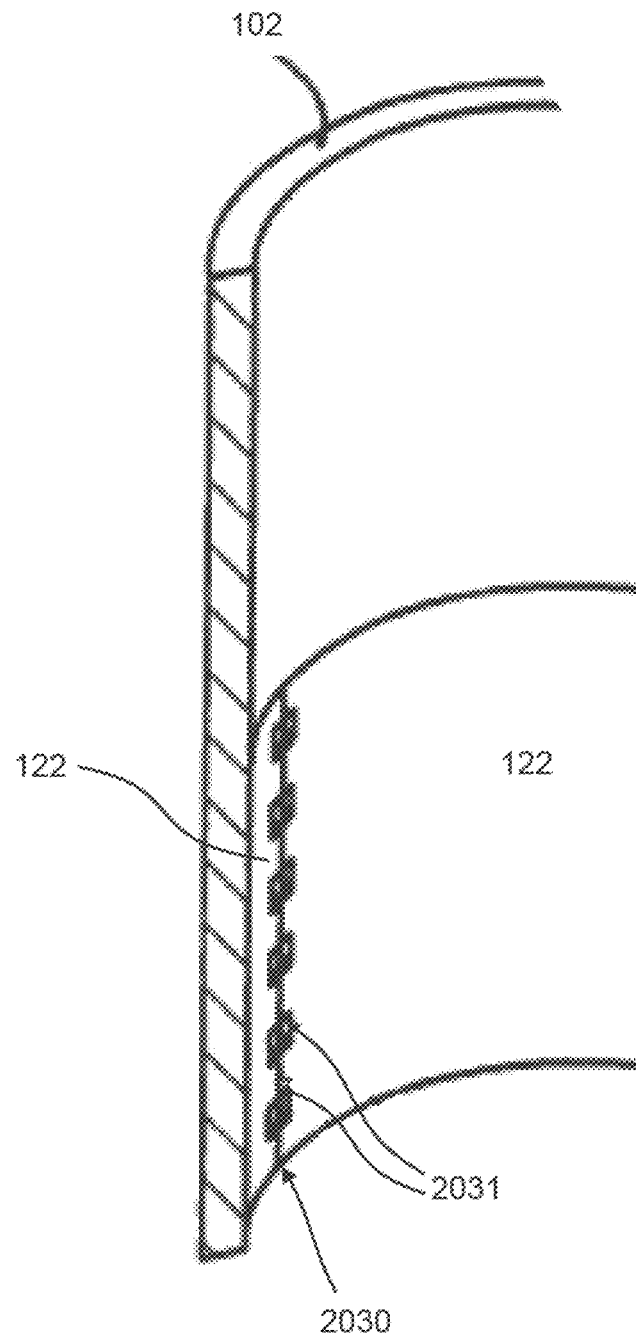
FIG. 36 shows a schematic three-dimensional view of an exemplary embodiment of a tower segment having sub-segments and a vertical joint.

The tower 102 has a lower end 102a and an upper end 102b. The tower 102 comprises a plurality of tower segments 120 which may be prefabricated concrete units or site-cast concrete units. The tower segments 120 are largely configured as closed annular segments 121, two of the latter being schematically indicated in FIG. 1. The tower segments 120 which in the lowered region of the tower 102 form a ring are assembled from sub-segments 122 such that said tower segments 120, apart from the horizontal joints between annular segments stacked on top of one another, also have vertical joints between the sub-segments 122. Such a vertical joint 2030, in which the sub-segments 122 by means of screw connections are connected by screw casings 2031, is shown in FIG. 35.

Figure 2:
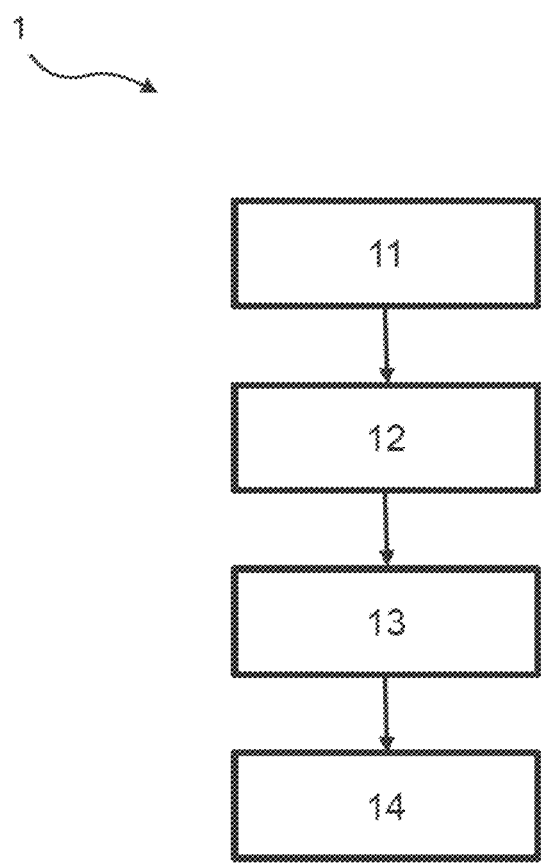
FIG. 2 shows a schematic flowchart of an exemplary embodiment of a method for disassembling a tower of a wind power plant.

A schematic flowchart of an exemplary embodiment of a method 1 for disassembling a tower 102 of a wind power plant 100 is illustrated in FIG. 2. The method 1 comprises selecting at step 11 suitable disassembly measures as a function of the tower location and the tower characteristics as well as preparing at step 12 the disassembly, in particular of the tower 102 and optionally the surroundings. The disassembly of the tower 102 is carried out in step 13. The disassembled tower is subsequently transported away in step 14. The step of carrying out 13 the disassembly of the tower 102 can in particular be designed in different ways and the further exemplary embodiments illustrated hereunder also include more detailed information to this end.

Figure 3:
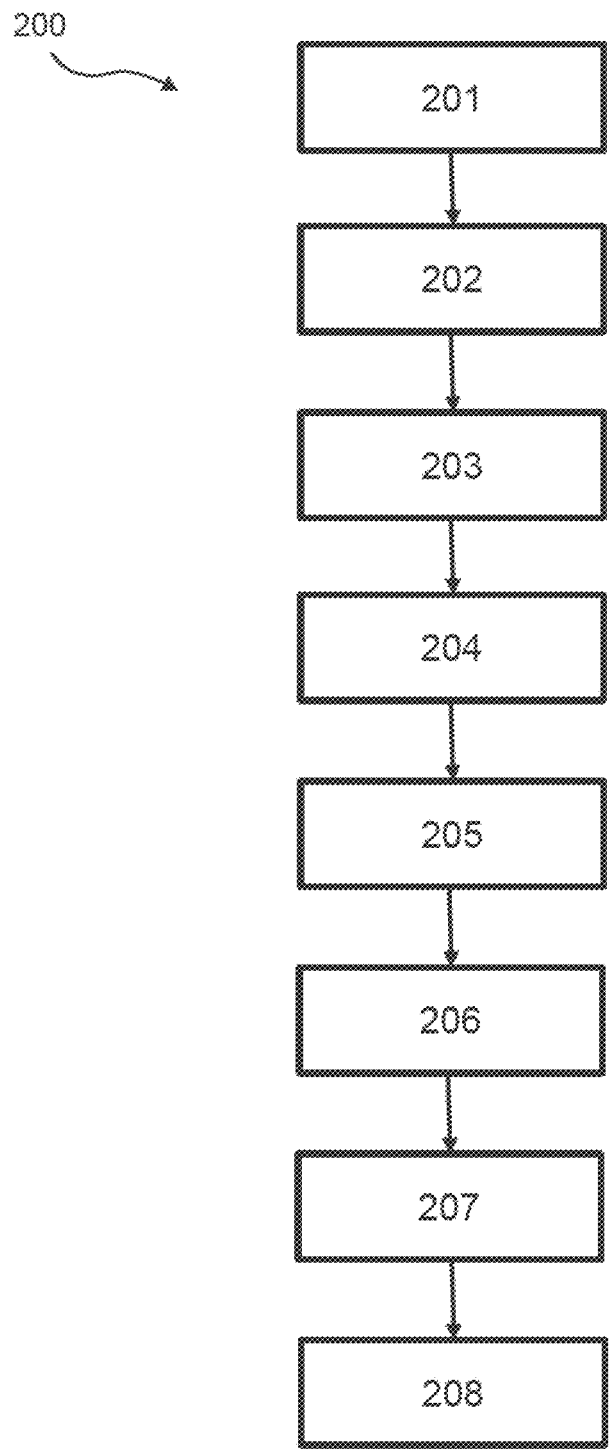
FIG. 3 shows a schematic flowchart of a further exemplary embodiment of steps of a method for disassembling a tower of a wind power plant.

A schematic flowchart of a further exemplary embodiment of steps of a method 200 for disassembling a tower 102 of a wind power plant 100 is illustrated in FIG. 3. In this method 200, the tower disassembly of the individual segments is illustrated by mutually separating the tower segments 120 by cuts of a saw.

This method 200 can in particular be used in locations with the following conditions: open location, for example meadows or fields; forest location with limited available space; dyke location; location with utility lines such as, for example, gas lines, in the immediate vicinity; location with limitations as a result of denial of use of neighboring properties; nature reserve; drinking water protection zone; location with adjacent buildings; water-proximal location, for example with ditches, waterways, lakes in the immediate vicinity; mountainous location. This method 200 can furthermore particularly be used in towers of the following type: site-cast concrete tower; prefabricated concrete tower having internally guided tendons and having joints which are connected in a materially integral manner, in particular adhesively bonded; prefabricated concrete tower having internally guided tendons and dry joints, in particular system joints; prefabricated concrete tower having externally guided tendons and having joints which are connected in a materially integral manner, in particular adhesively bonded.

In step 201, all installed parts in the interior of the tower are first removed prior to the disassembly, whereby lightning protection installations and the access ladder for safety reasons are released once the disassembly progresses to the respective segment to be severed.

Figure 13:
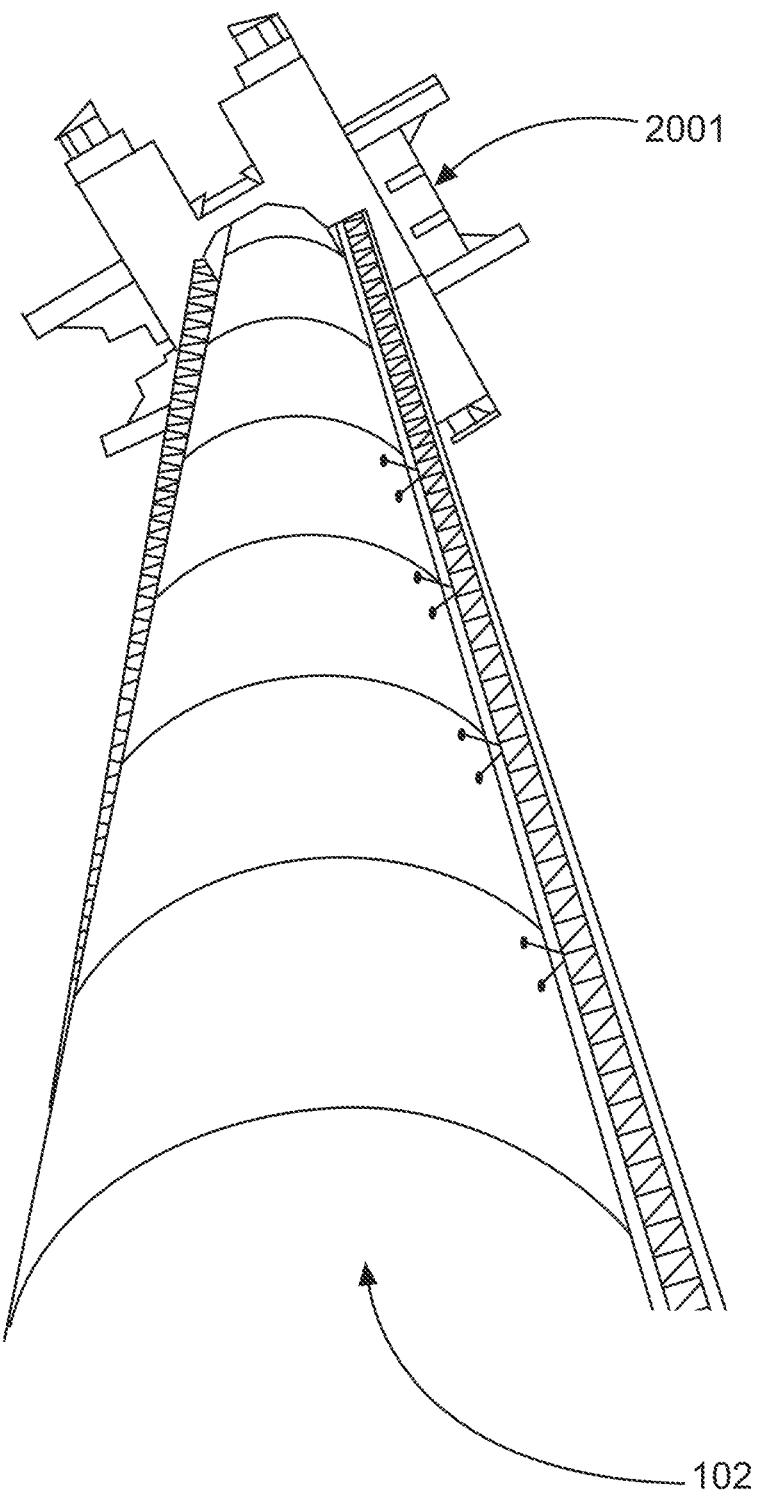
FIG. 13 shows a schematic three-dimensional view of a tower of a wind power plant, having an exemplary work platform disposed on the external side.
Figure 14:
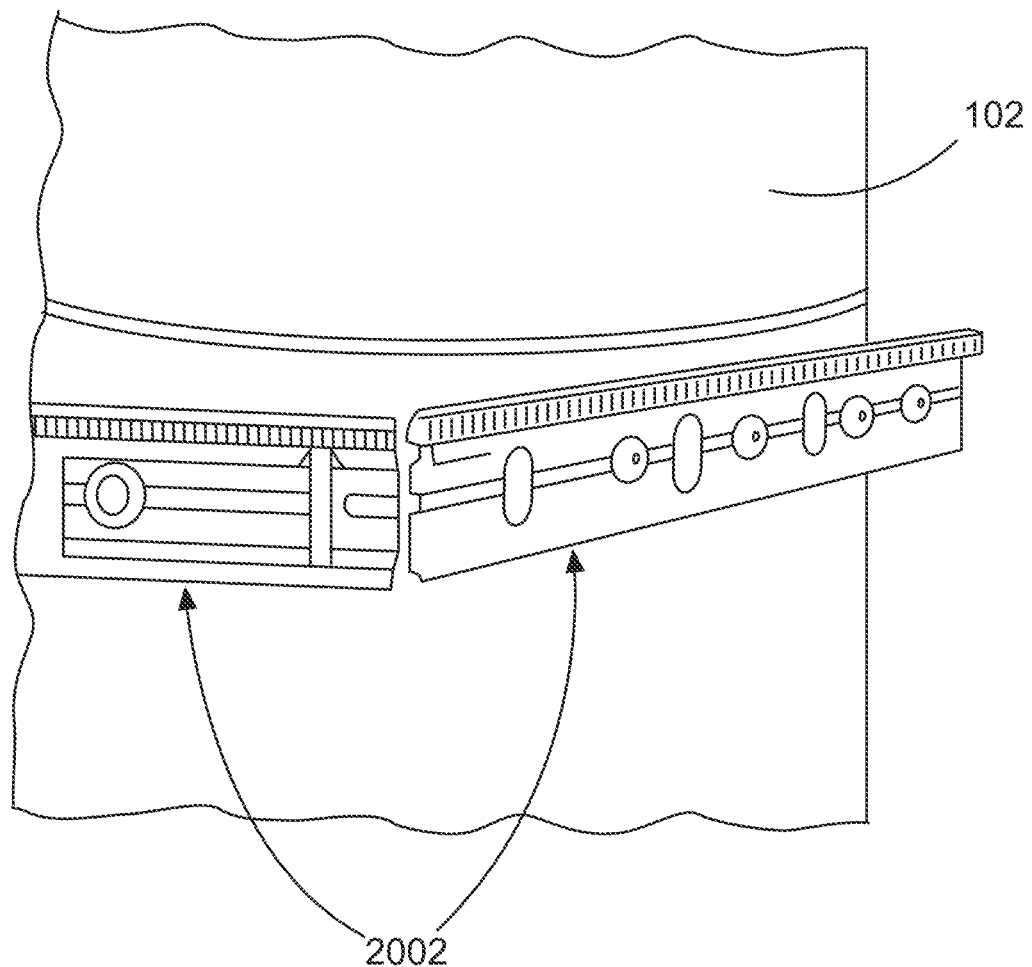
FIG. 14 shows a schematic three-dimensional view of a tower of a wind power plant having exemplary guide rails for a concrete wall saw.

In step 202, a work platform is disposed on the tower 102. This work platform can be disposed in the interior of the tower as well as on the outside of the tower. A work platform 2001 which is disposed on the outside of the tower 102 is illustrated in FIG. 13.

Figure 15:
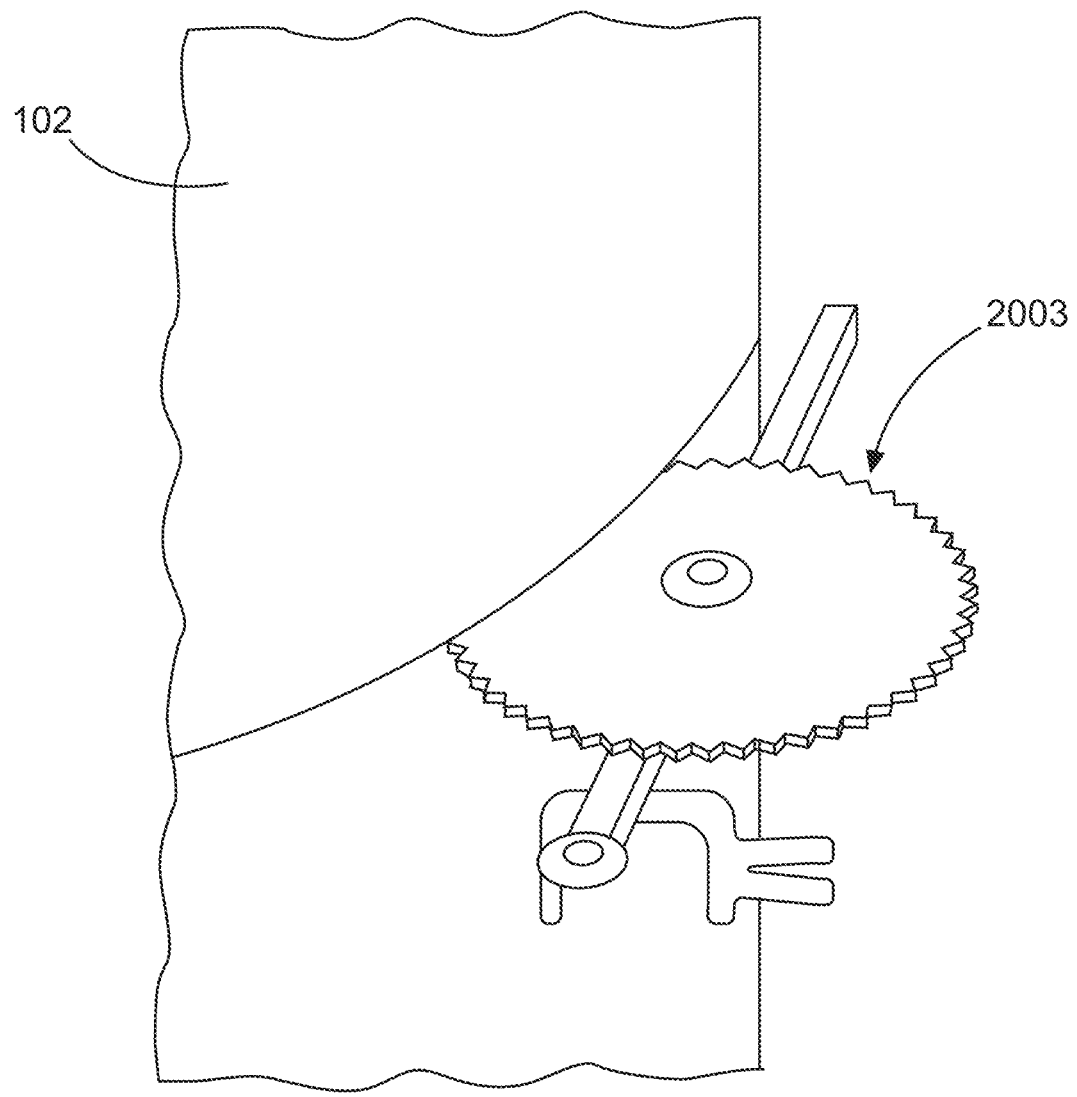
FIG. 15 shows a schematic three-dimensional view of a tower of a wind power plant having an exemplary concrete wall saw.

In step 203, a concrete wall saw 2003 (FIG. 15) which, for the cut between an upper conjointly braced steel segment and the uppermost concrete segment is guided by way of guide rails 2002 that are screwed to the segment, is applied in the region of the horizontal cut joint, and the steel segment is separated from the uppermost concrete segment. While separating, the cut joints are secured against unintentional subsiding of the segments with steel chocks or timber chocks.

Figure 16:
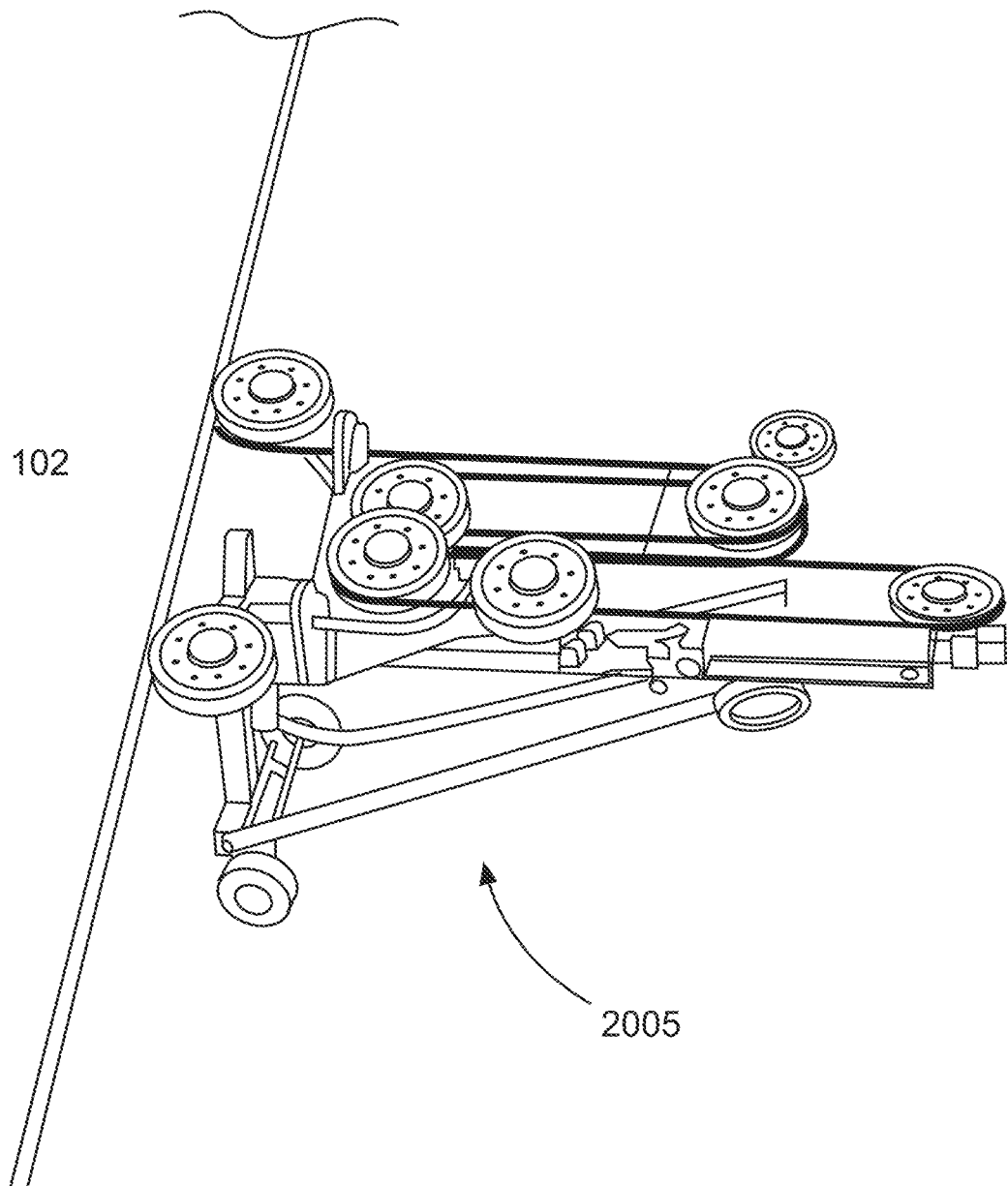
FIG. 16 shows a schematic three-dimensional view of a tower of a wind power plant having an exemplary wire saw.

In step 204, a pad saw or a wire saw 2005 (FIG. 16) for the cuts between the subsequent concrete segments 120 is fastened to one side of the tower 102, and in step 205, a cut joint between two adjacent segments 120 is severed to the extent of approx. ⅔.

Figure 17:
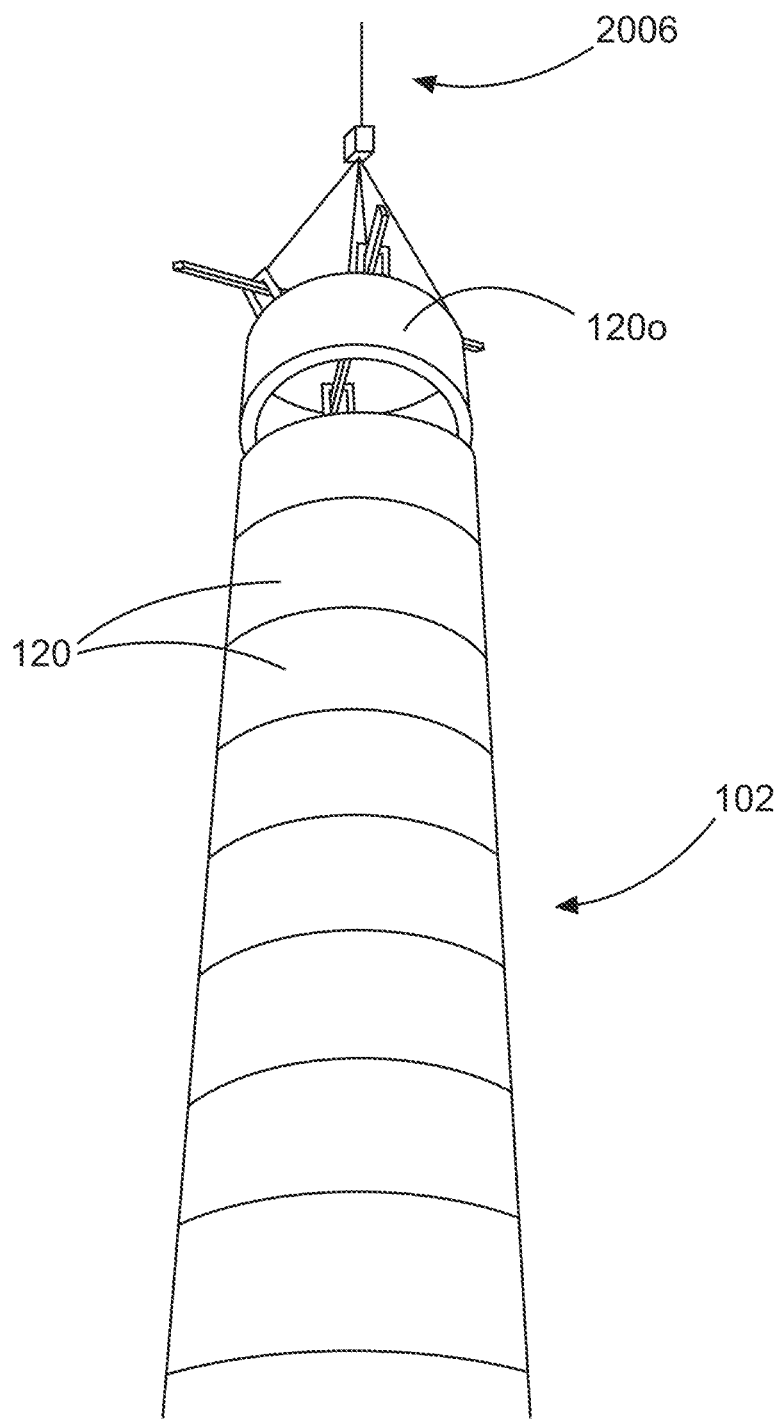
FIG. 17 shows a schematic three-dimensional view of an exemplary tower of a wind power plant having a raised uppermost tower segment.

In step 206, the respective uppermost segment 120o is then lashed to a disassembly crane 2006 (wherein the lashing points of the segment to be lifted are optionally to be exposed), as is illustrated in FIG. 17. In the case of internally braced tendons, the adhesive of the segments is preferably also removed from the threaded sleeves and the thread of the sleeves optionally recut.

In step 207, the cut between the two adjacent tower segments 120 is finally completely severed. In step 208, the severed uppermost segment 120 can then be lifted by means of a crane 2006 and be deposited on a storage surface close to the tower, for example. Any connections which are potentially still present at vertical interfaces between sub-segments 122 can also be released on the ground.

Steps 205-208 are repeated according to the number of segments to be disassembled.

Figure 4:
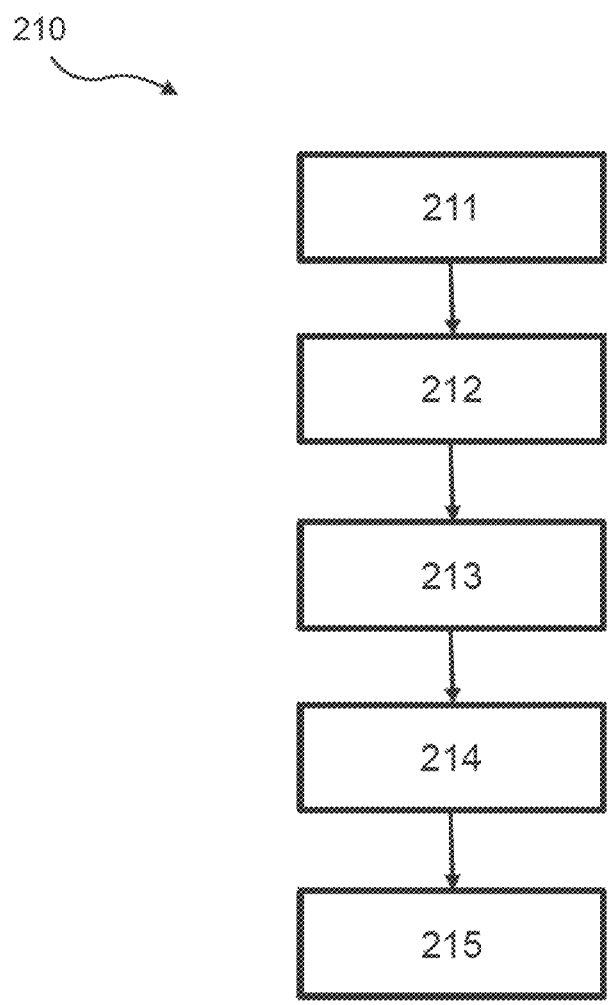
FIG. 4 shows a schematic flowchart of a further exemplary embodiment of steps of a method for disassembling a tower of a wind power plant.

A schematic flowchart of a further exemplary embodiment of steps of a method 210 for disassembling the tower 102 of a wind power plant 100 is illustrated in FIG. 4. In this method 210, the tower disassembly of the individual segments is illustrated without cuts of a saw between the adjacent tower segments 120. This method 210 is particularly preferably able to be used when the tower 102 possesses externally guided tendons and a system joint which is in particular not adhesively bonded.

This method 210 can be used in particular in locations with the following conditions: open location, for example meadows or fields; forest location with limited available space; dyke location; location with utility lines such as, for example, gas lines, in the immediate vicinity; location with limitations as a result of denial of use of neighboring properties; nature reserve; drinking water protection zone; location with adjacent buildings; water-proximal location, for example with ditches, waterways, lakes in the immediate vicinity; mountainous location. This method 210 can furthermore particularly be used in prefabricated concrete towers having externally guided tendons and having dry joints, in particular system joints.

Figure 18:
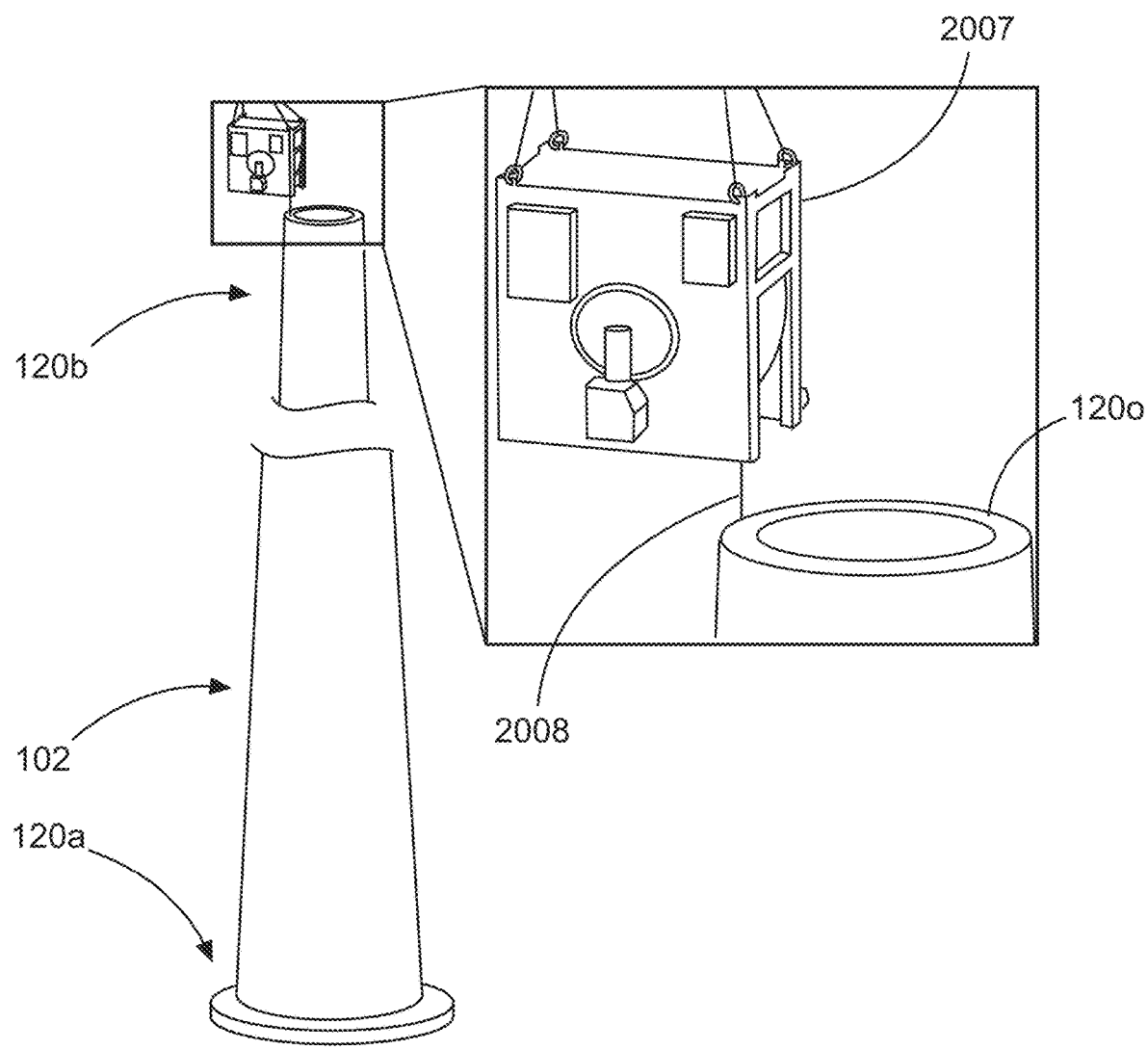
FIG. 18 shows a schematic three-dimensional view of a tower of a wind power plant having an exemplary drum-reeling apparatus.
Figure 19:
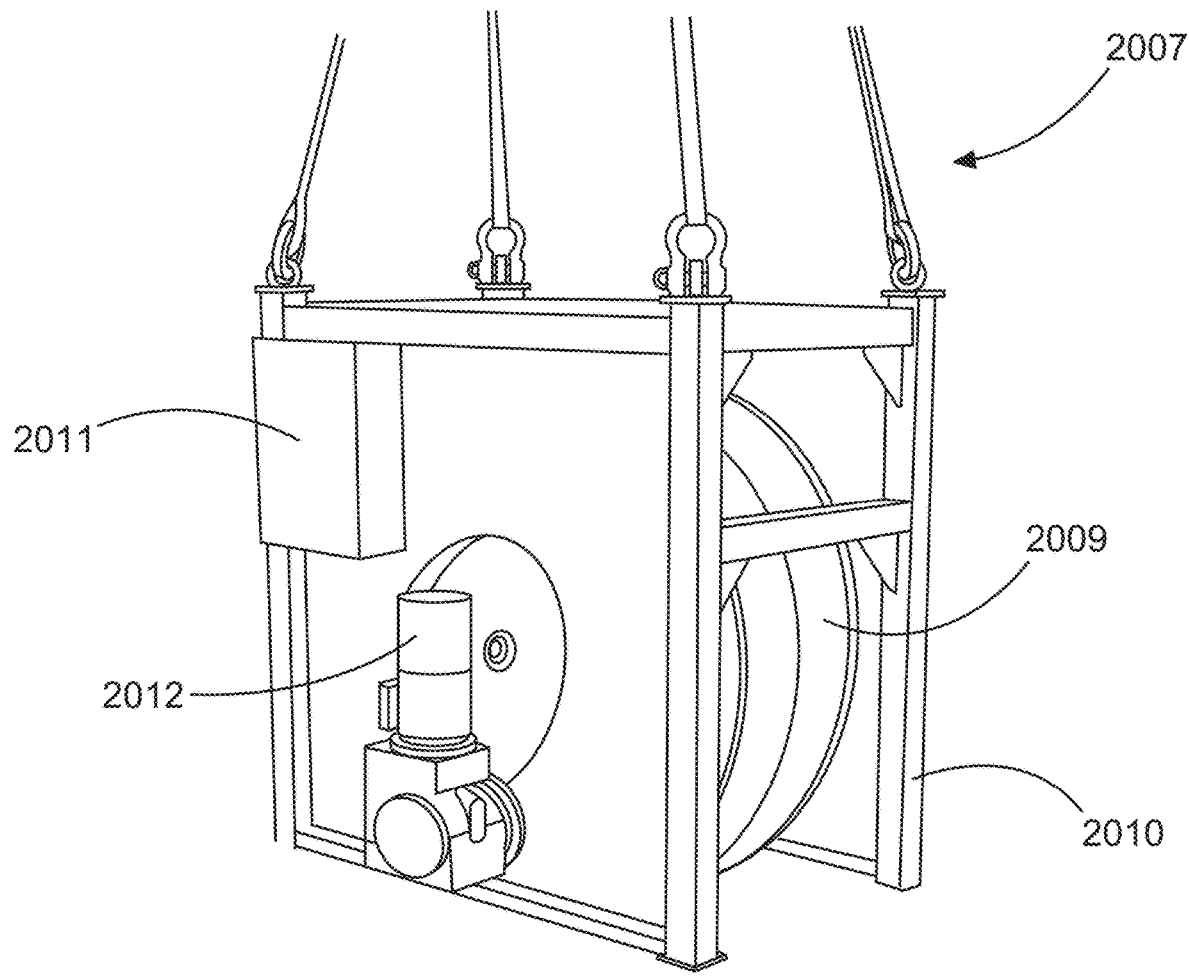
FIG. 19 shows a schematic three-dimensional view of an exemplary drum-reeling apparatus.

In a first step 211, the tendons 2008 (FIG. 18) are separated in the region of the tower base 102a, optionally after being previously relaxed, and preferably pulled out through the upper end 102b of the tower 102, and wound up using a drum-reeling apparatus 2007 which is illustrated in FIGS. 18 and 19, for example. The drum-reeling apparatus 2007 is configured as a tendon lowering apparatus by way of which the tendons 2008 during the erection of the tower 102 are lowered from above the tower top 102b down to the tower base 102a. Such a tendon lowering apparatus 2007 serves for receiving and transporting tendon drums 2009 and comprises an apparatus frame 2010, a switch cabinet 2011 and a drive 2012. The winding up of the externally guided tendons 2008 by means of such a drum-reeling apparatus 2007 has the advantage that the tendons 2008 are thus compactly stowed and able to be easily transported.

If required, a work platform 2001 can be disposed in the interior of the tower or on the outside of the tower 102.

In the next step 212, the respective uppermost tower segment 120o is lashed to a disassembly crane 2006, lifted and removed. This step is repeated according to the number of tower segments 120.

In a further step 213, the connections of sub-segments 122 at vertical interfaces of annular segments 121 can be separated on the ground.

In a further step 214, the segments 120 can then be optionally comminuted on-site, for example by means of a demolition excavator having demolition shears and a chisel. The concrete material here by way of a crusher plant can be crushed to a normal size and be reused in the construction of roads and paths, for example. The rebar steel as steel scrap likewise preferably goes for recycling.

In a last step 215, the disassembled concrete tower is then transported away. If the comminution of the segments has not taken place on site, the segments 120 are transported away and optionally comminuted at another location.

Figure 5:
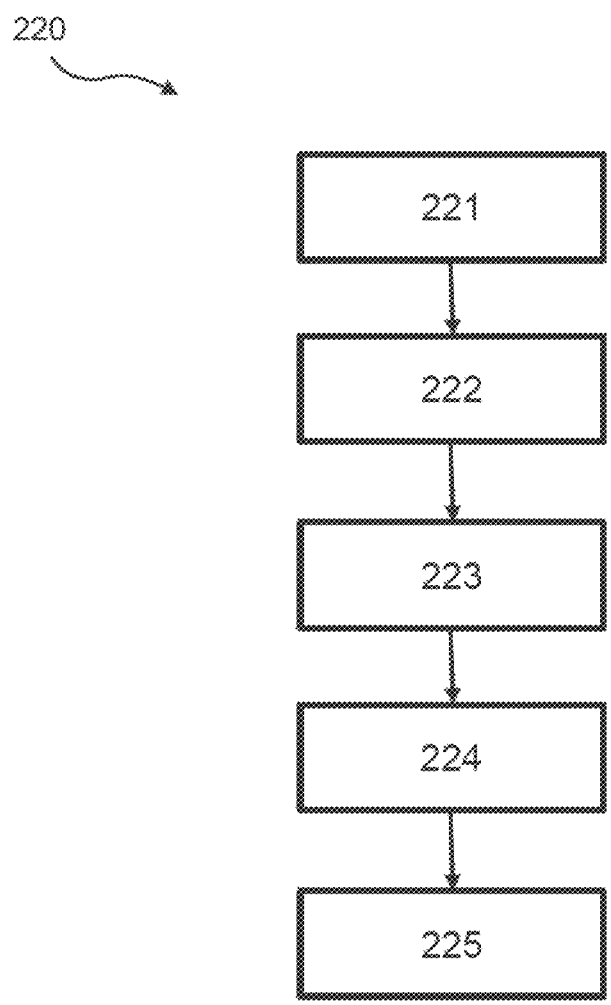
FIG. 5 shows a schematic flowchart of a further exemplary embodiment of steps of a method for disassembling a tower of a wind power plant.
Figure 20:
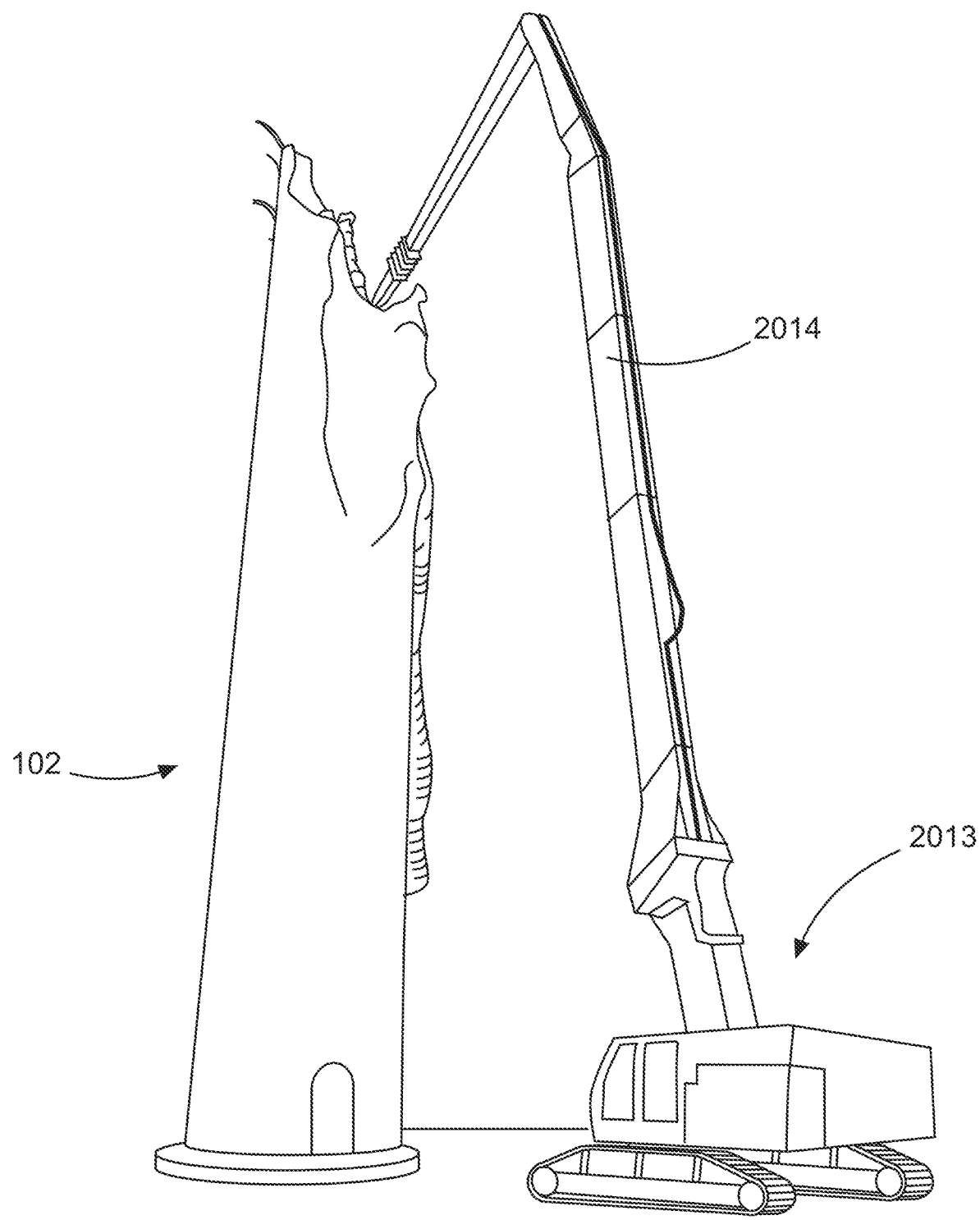
FIG. 20 shows a schematic three-dimensional view of a tower of a wind power plant having an exemplary demolition excavator with a long front.
Figure 21:
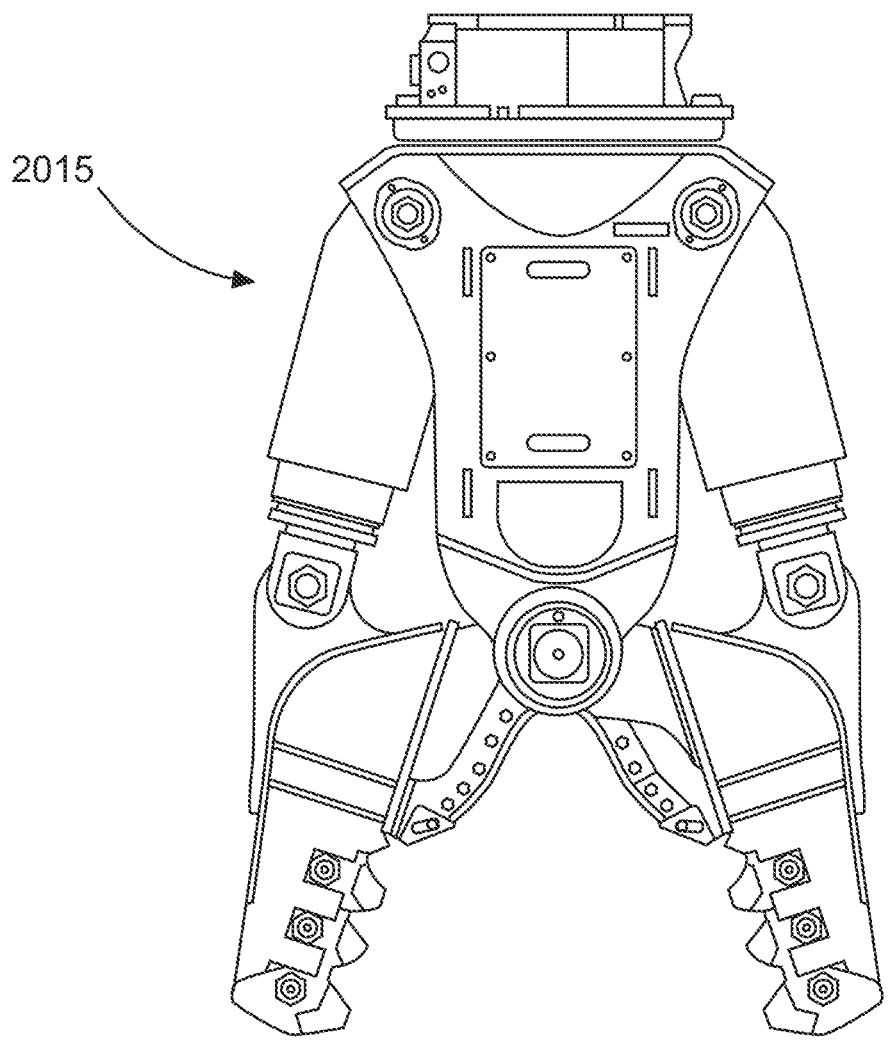
FIG. 21 shows a schematic three-dimensional view of exemplary demolition shears.

A schematic flowchart of a further exemplary embodiment of steps of a method 220 for disassembling a tower 102 of a wind power plant 100 using a demolition excavator is illustrated in FIG. 5. FIG. 20 shows a demolition excavator 2013 having a long front, or a telescopic arm 2014, respectively, when disassembling the tower; FIG. 21 shows hydraulically controlled demolition shears 2015.

This method 220 can be used in particular in locations with the following conditions: open location, for example meadows or fields; forest location with limited available space; dyke location; water-proximal location, for example with ditches, waterways, lakes in the immediate vicinity; mountainous location. This method 220 can furthermore particularly be used in towers of the following type: site-cast concrete tower; prefabricated concrete tower having internally guided tendons and having joints which are connected in a materially integral manner, in particular adhesively bonded; prefabricated concrete tower having internally guided tendons and dry joints, in particular system joints; prefabricated concrete tower having externally guided tendons and having joints which are connected in a materially integral manner, in particular adhesively bonded. With some limitations this method 220 is suitable in drinking water protection zones.

In a first step 221 of the method 220 a large area of the region about the tower 102 is cordoned off for safety reasons. The radius of the region to be cordoned off, in the case of the tower 102 which has a height of approx. 70 m (meters) and is to be disassembled, is approximately 30 m about the tower 102.

In step 222, the installed parts of the tower, with the exception of the access ladder and the lightning protection connection, which for reasons of safety will still remain in the tower for now, are removed prior to the disassembly.

Provided in step 223 is a demolition excavator 2013 having a long front 2014 and demolition shears 2015 disposed on the latter. In step 224, the tower segments 120 of the tower 102 are comminuted successively from the top to the bottom using said demolition excavator 2013.

In step 225, the rubble is subsequently separated on the ground and optionally further comminuted and then transported away.

Since demolition excavators 2013 are typically limited in terms of the operating height thereof, the method 220 illustrated here is preferably used in combination with other methods and technologies, in particular when the height of the tower to be disassembled exceeds the operating height of the demolition excavator. The height of the tower 102 that exceeds the operating height of the demolition excavator 2013, prior to the method 220 being used, is preferably first disassembled by using another method or by means of another technology.

Figure 6:
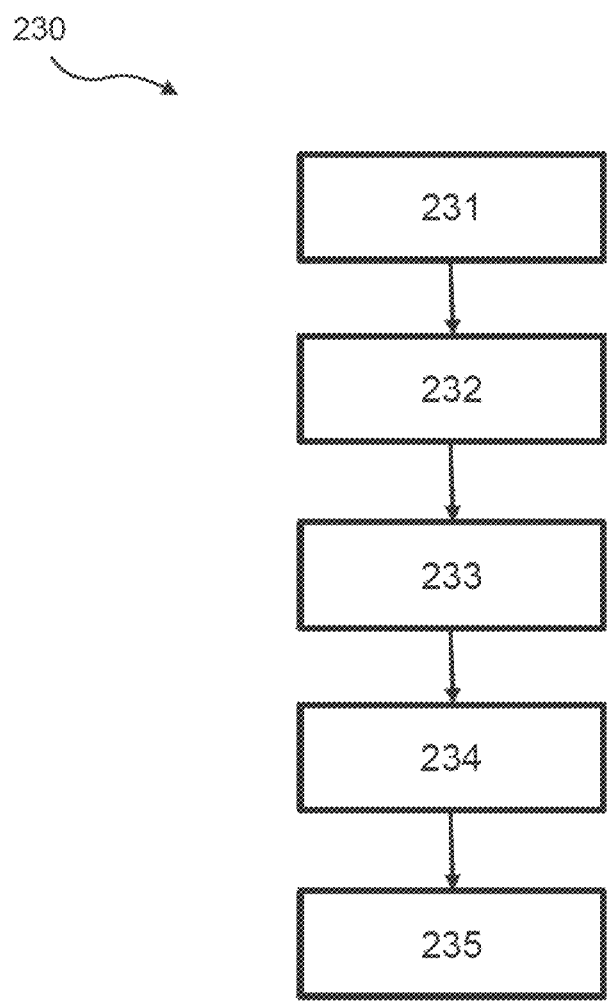
FIG. 6 shows a schematic flowchart of a further exemplary embodiment of steps of a method for disassembling a tower of a wind power plant.

A schematic flowchart of a further exemplary embodiment of steps of a method 230 for disassembling a tower 102 of a wind power plant 100 using a cable excavator is illustrated in FIG. 6.

This method 230 can be used in particular in locations with the following conditions: open location, for example meadows or fields; forest location with limited available space; dyke location; water-proximal location, for example with ditches, waterways, lakes in the immediate vicinity; mountainous location. This method 230 can furthermore particularly be used in towers of the following type: site-cast concrete tower; prefabricated concrete tower having internally guided tendons and having joints which are connected in a materially integral manner, in particular adhesively bonded; prefabricated concrete tower having internally guided tendons and dry joints, in particular system joints; prefabricated concrete tower having externally guided tendons and having joints which are connected in a materially integral manner, in particular adhesively bonded. With some limitations this method 230 is suitable in drinking water protection zones.

In step 231, a large area of the region about the tower 102 is first cordoned off for safety reasons. The radius of the region to be cordoned off, in the case of a tower which has a height of 70 m and is to be disassembled, is approx. 30 m about the tower 102.

In step 232, all installed parts of the tower with the exception of the access ladder and the lightning protection connection, which remain in the tower 102 for safety reasons, are then first to be removed prior to the disassembly.

In the next step 233, a cable excavator having demolition shears 2015 which by way of a hook block are fastened to the lattice boom of the cable excavator is to be provided. In step 234, the tower segments 120 of the tower 102 are comminuted successively from the top to the bottom using said demolition shears 2015.

In step 235, the rubble is subsequently separated on the ground and optionally further comminuted and then transported away.

Since cable excavators are also typically limited in terms of the operating height thereof, the method 230 illustrated here is preferably used in combination with other methods and technologies, in particular when the height of the tower to be disassembled exceeds the operating height of the cable excavator. The height of the tower 102 that exceeds the operating height of the cable excavator, prior to the method 230 being used, is preferably first disassembled by another method or by means of another technology.

Figure 7:
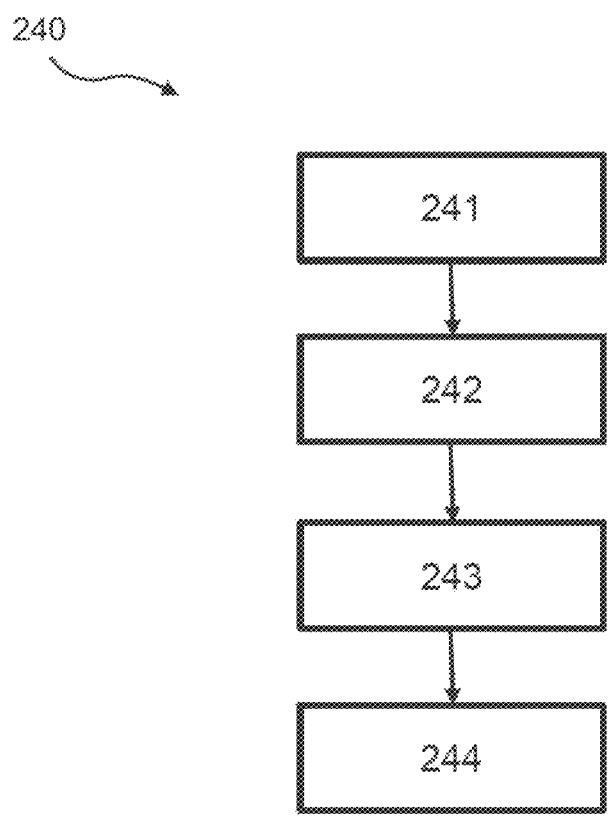
FIG. 7 shows a schematic flowchart of a further exemplary embodiment of steps of a method for disassembling a tower of a wind power plant.

A schematic flowchart of a further exemplary embodiment of steps of a method 240 for disassembling a tower 102 of a wind power plant 100 by felling and detonating is illustrated in FIG. 7.

This method 240 can be used in particular in locations with the following conditions: open location, for example meadows or fields; mountainous location. This method 240 can furthermore particularly be used in towers of the following type: site-cast concrete tower; prefabricated concrete tower having internally guided tendons and joints which are connected in a materially integral manner, in particular adhesively bonded; prefabricated concrete tower having internally guided tendons and dry joints, in particular system joints.

Figure 22:
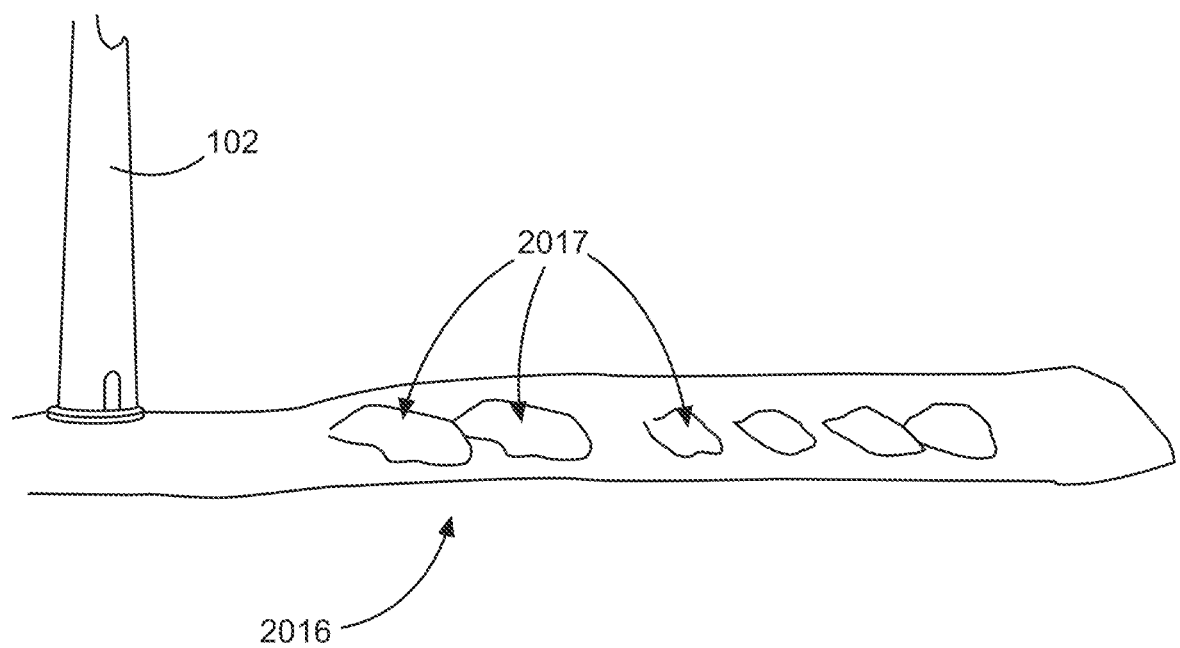
FIG. 22 shows a schematic three-dimensional view of an exemplary fall zone bed having sand ribs.

In a first step 241 here, a fall zone bed 2016 is first established, wherein—depending on the construction ground to be encountered—the topsoil has to be cleared, the area to be drained and sand ribs 2017 for damping the impact of the tower 102 optionally have to be established (FIG. 22). Corresponding cordoning-off over a large area is of course also preferred here.

Figure 23:
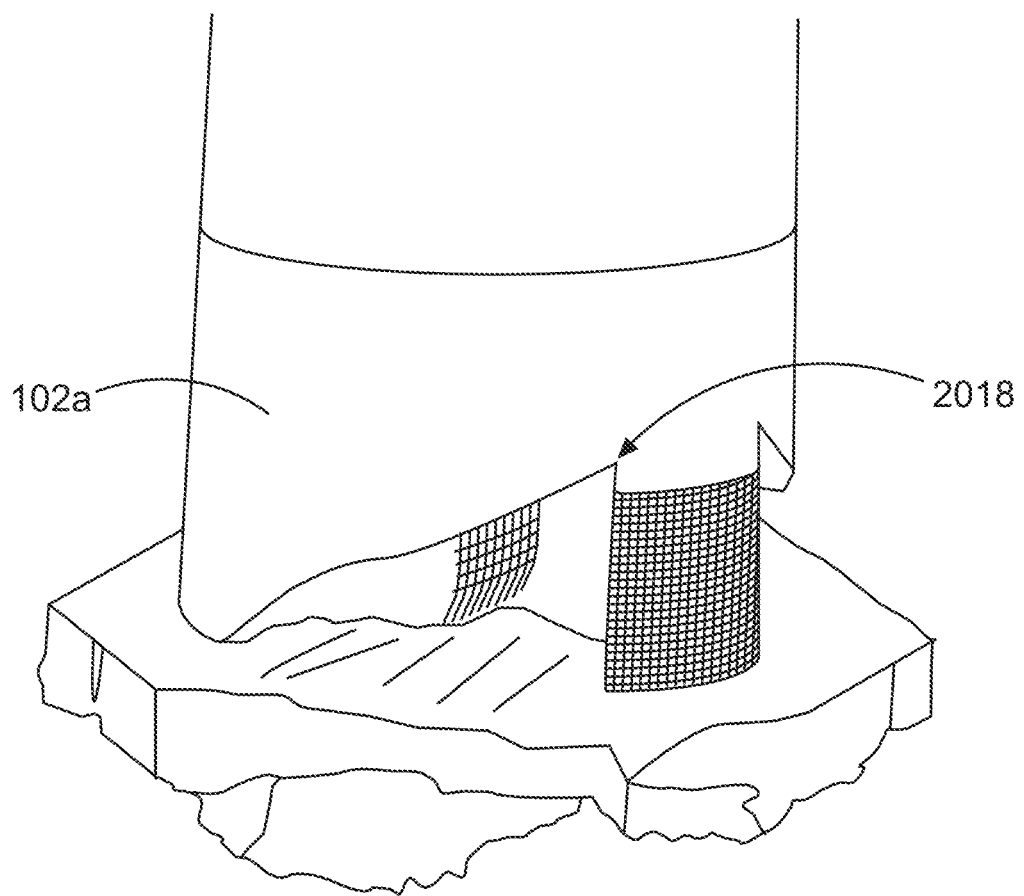
FIG. 23 shows a schematic three-dimensional view of an exemplary tower base having a notch cut.

In a further step 242, the tower base 102a is then pre-weakened by a notch cut 2018, as can be seen in FIG. 23.

Figure 24:
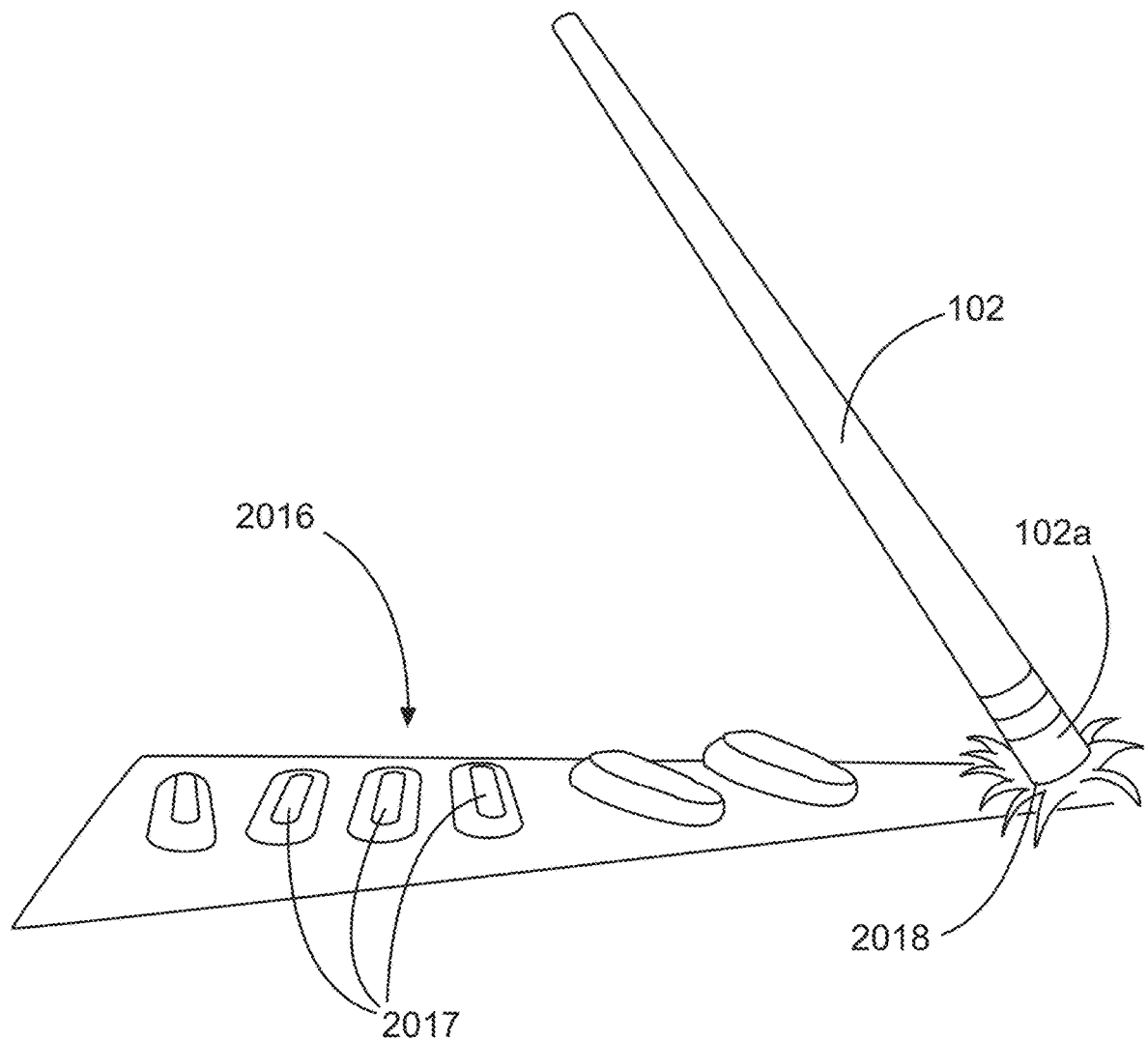
FIG. 24 shows a schematic three-dimensional view of an exemplary tower when felling.
Figure 25:
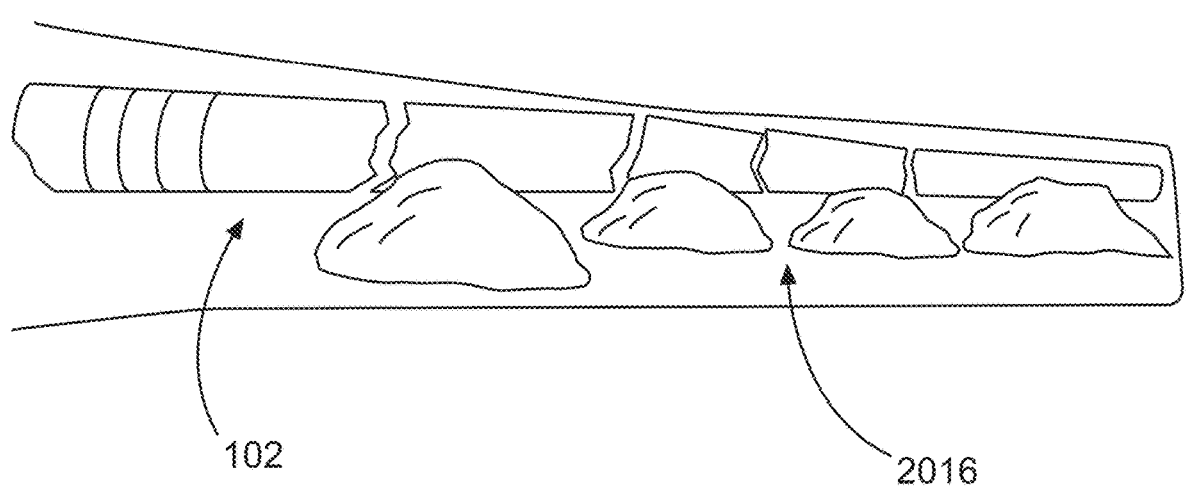
FIG. 25 shows a schematic three-dimensional view of an exemplary felled tower.

In a further step 243, detonation charges are placed in drill holes in the region to be detonated and ignited. A defined region here is blasted out of the tower base 102a, and the tower 102 falls in the direction of the prepared fall zone bed 2016, as is illustrated in FIG. 24. The felled tower 102 can be seen in FIG. 25. Accompanying vibration measurements are preferably to be carried out in the vicinity, this assisting supervision and providing documentation in the event of any potential damage.

In a further step 244, the rubble is separated on the ground in order for said rubble to be able to be recycled, and transported away.

Figure 8:
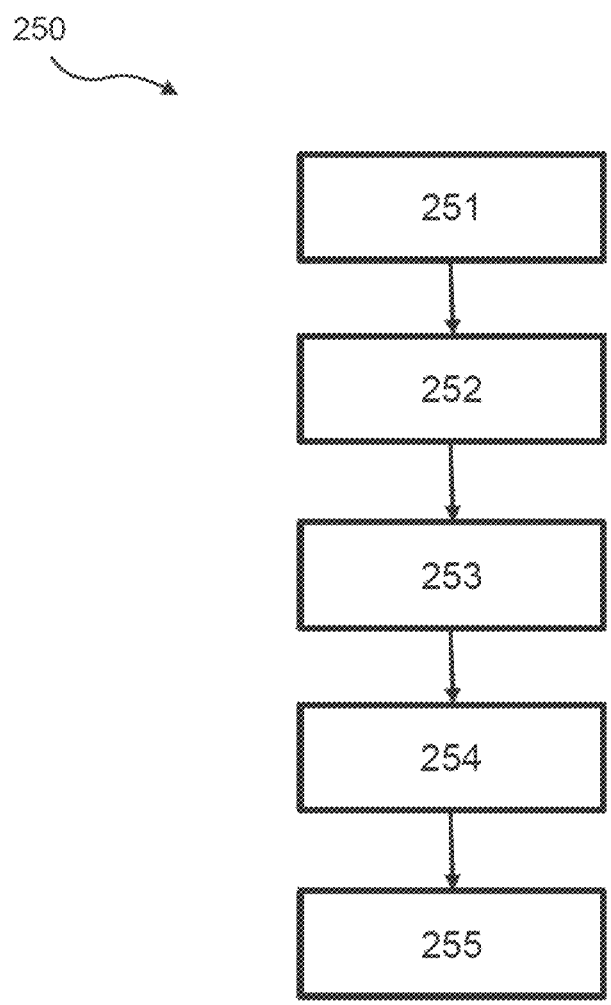
FIG. 8 shows a schematic flowchart of a further exemplary embodiment of steps of a method for disassembling a tower of a wind power plant.

A schematic flowchart of a further exemplary embodiment of steps of a method 250 for disassembling a tower 102 of a wind power plant 100 by means of an impact ball is illustrated in FIG. 8.

This method 250 can be used in particular in locations with the following conditions: open location, for example meadows or fields; water-proximal location, for example with ditches, waterways, lakes in the immediate vicinity; mountainous location. This method 250 can furthermore particularly be used in towers of the following type: site-cast concrete tower; prefabricated concrete tower having internally guided tendons and joints which are connected in a materially integral manner, in particular adhesively bonded; prefabricated concrete tower having internally guided tendons and dry joints, in particular system joints; prefabricated concrete tower having externally guided tendons and having joints which are connected in a materially integral manner, in particular adhesively bonded. With some limitations this method 250 is suitable for drinking water protection zones.

In this method 250, a large area of the region about the tower 102 is also to be cordoned off for safety reasons in a first step 251.

In a further step 252 all installed parts of the tower 102, with the exception of the access ladder and the lightning protection connection, which remain in the tower for safety reasons, are to be removed. In a step 253, a lattice boom crane 2033 having an impact weight is then to be provided.

Figure 26:
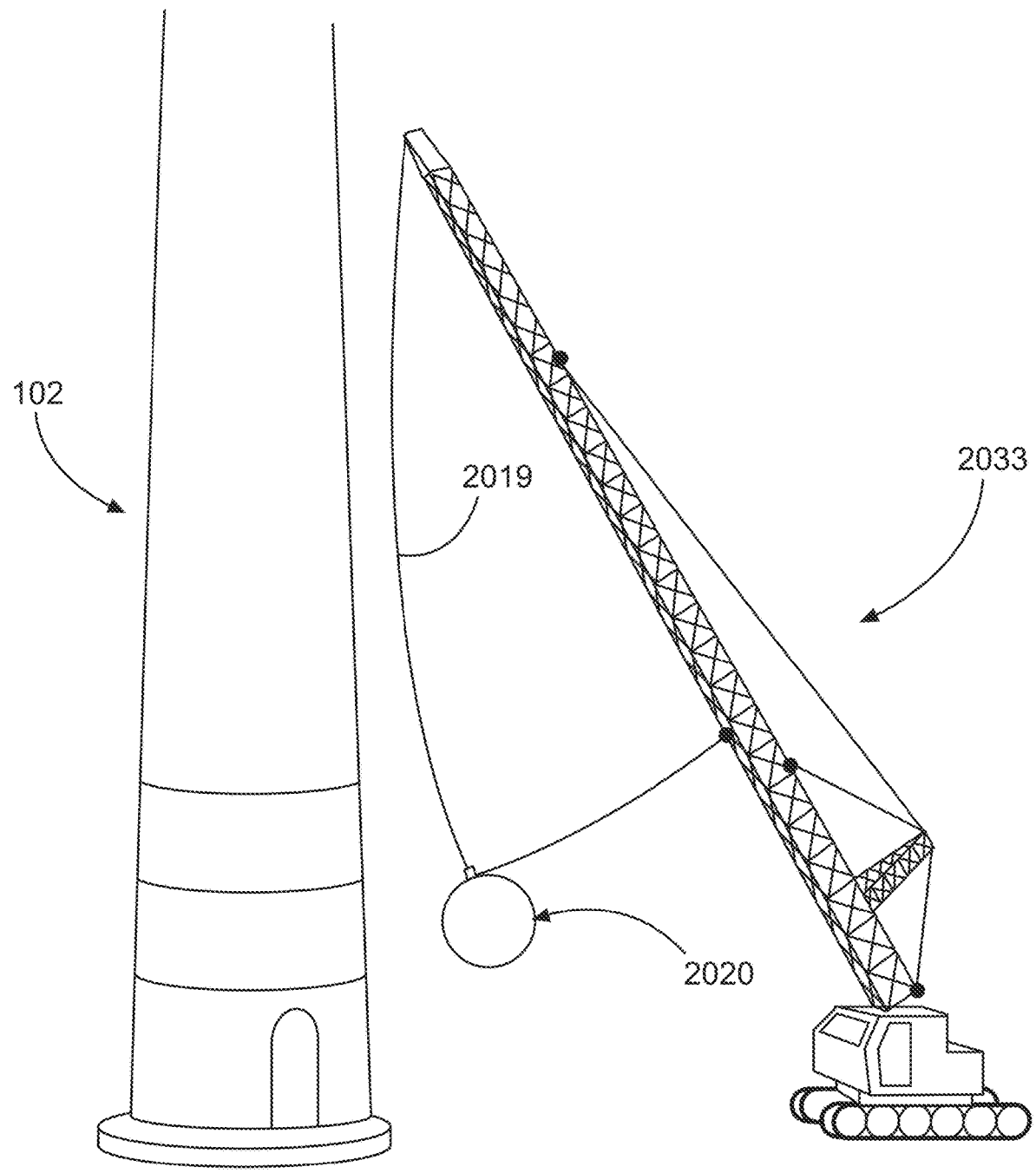
FIG. 26 shows a schematic three-dimensional view of an exemplary tower of a wind power plant when demolishing with an impact ball.

The actual disassembly takes place in step 254, wherein the impact ball 2020, which is attached to a cable 2019 on the crane hook, is horizontally deflected by a second cable and, once released, impacts the tower 102 (cf. FIG. 26). The concrete by virtue of the high weight of the impact ball 2020 here is released from the reinforcement and is then loosened out of the tower 102 piece by piece, as a result of which pieces of the concrete tower with a length of approx. 8 m can be brought to topple, which can likewise be seen in FIG. 26.

Here too, in a further step 255, the rubble is separated on the ground so as to make it suitable for recycling or disposal, and is subsequently transported away.

Figure 9:
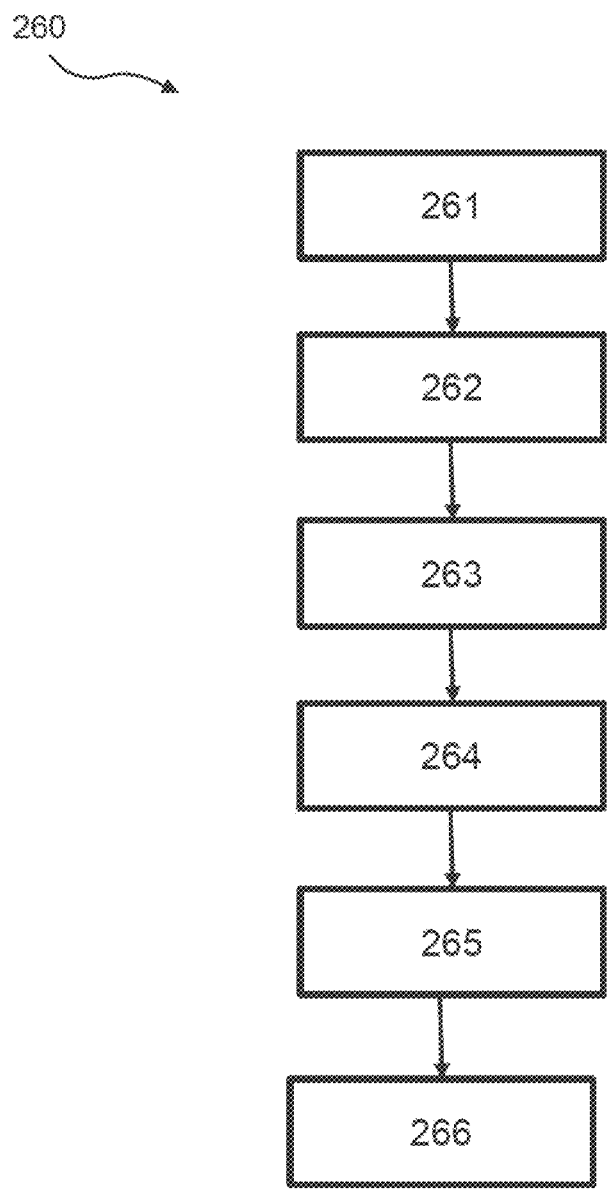
FIG. 9 shows a schematic flowchart of a further exemplary embodiment of steps of a method for disassembling a tower of a wind power plant.

A schematic flowchart of a further exemplary embodiment of steps of a method 260 for disassembling a tower 102 of a wind power plant 100 using a tower-based demolition tool is illustrated in FIG. 9.

This method 260 can be used in particular in locations with the following conditions: open location, for example meadows or fields; forest location with limited available space; dyke location; location with utility lines such as, for example, gas lines, in the immediate vicinity; location with limitations as a result of denial of use of neighboring properties; drinking water protection zone; location with adjacent buildings; water-proximal location, for example with ditches, waterways, lakes in the immediate vicinity; mountainous location. This method 260 can furthermore particularly be used in towers of the following type: site-cast concrete tower; prefabricated concrete tower having internally guided tendons and having joints which are connected in a materially integral manner, in particular adhesively bonded; prefabricated concrete tower having internally guided tendons and dry joints, in particular system joints. With some limitations this method 260 is suitable for nature reserves. With some limitations this method is likewise suitable for prefabricated concrete towers having externally guided tendons and having joints which are connected in a materially integral manner, in particular adhesively bonded.

Here too, in a first step 261, all installed parts of the tower 102 with the exception of the access ladder and the lightning protection connection, which remain in the tower 102 for safety reasons, are to be removed prior to the disassembly. Because the rubble in the method 260 described here mainly falls into the interior of the tower, cordoning off the region about the tower 102 can optionally relate to a smaller area in comparison to other methods.

In an optional step 262, a lateral work platform from which the demolition tool is controlled is assembled. Alternatively, the demolition tool can optionally also be controlled from the ground.

Figure 27:
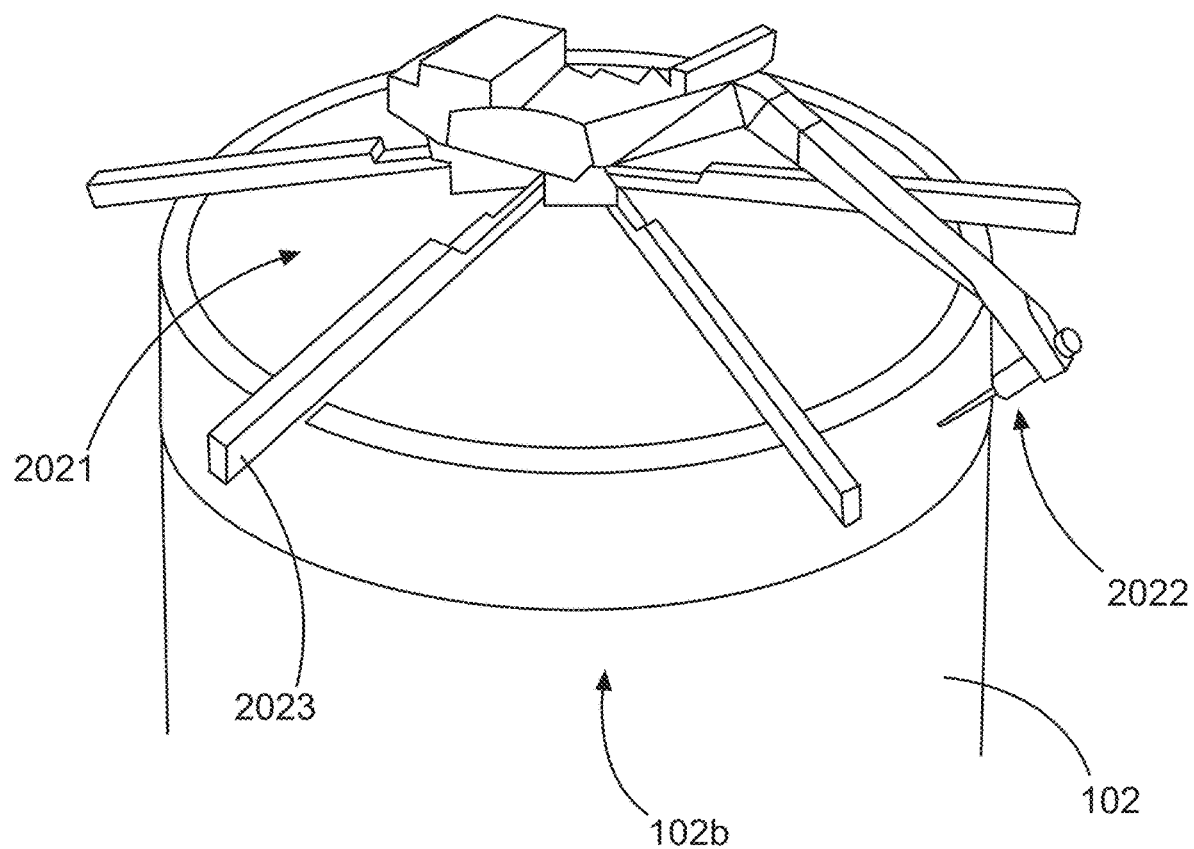
FIG. 27 shows a schematic three-dimensional view of the upper end of a tower having an exemplary demolition robot or walking excavator, respectively.
Figure 29:
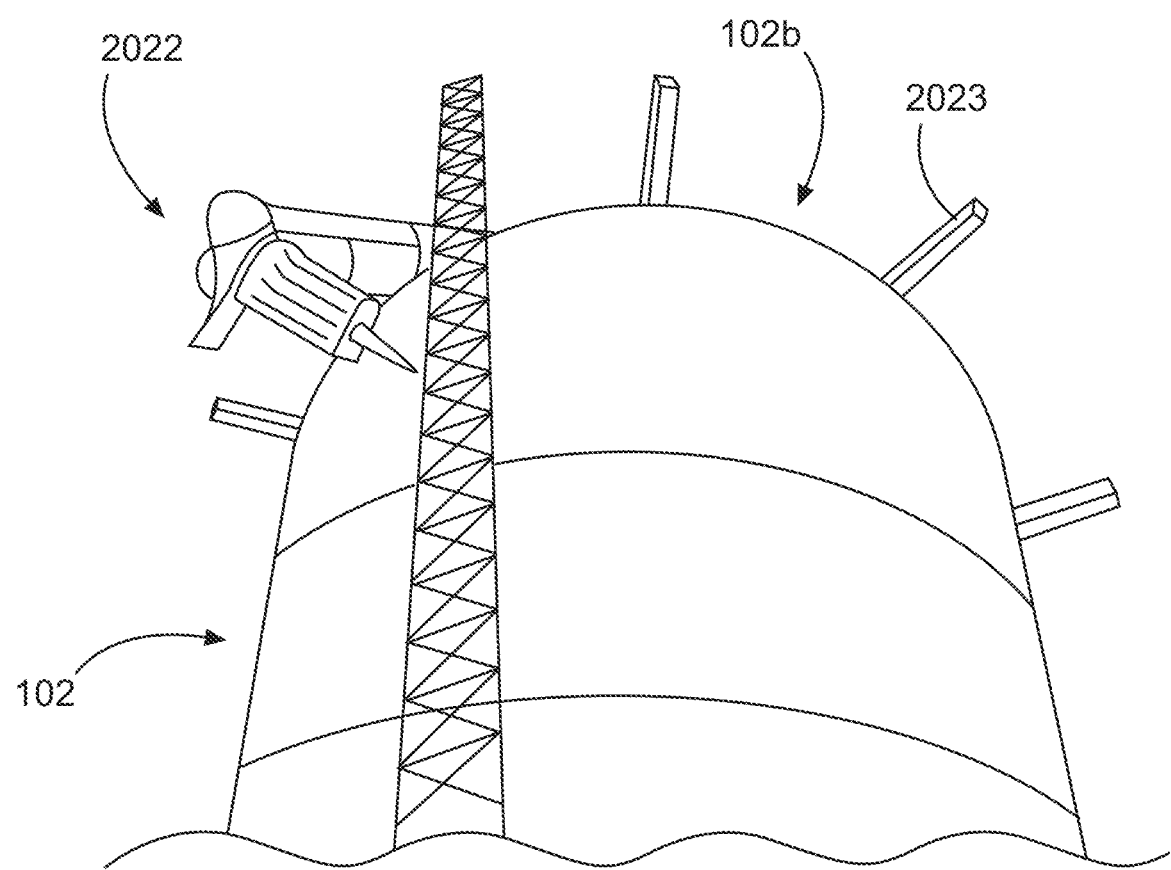
FIG. 29 shows a schematic three-dimensional view of the upper end of a tower having a further exemplary demolition robot or walking excavator, respectively.

In a further step 263, the tower-based demolition tool, such as, for example, a demolition robot or a walking excavator 2021, respectively, (FIGS. 27 and 29) is placed on the upper end 102b of the tower 102 by a crane. Such a demolition robot or walking excavator 2021, respectively, is equipped with demolition shears 2015 or, for example, a chisel 2022, and can be fastened to the upper end 102b of the tower 102 by means of outriggers 2023 on the tower wall, as can be seen in FIGS. 27 and 29.

Figure 30:
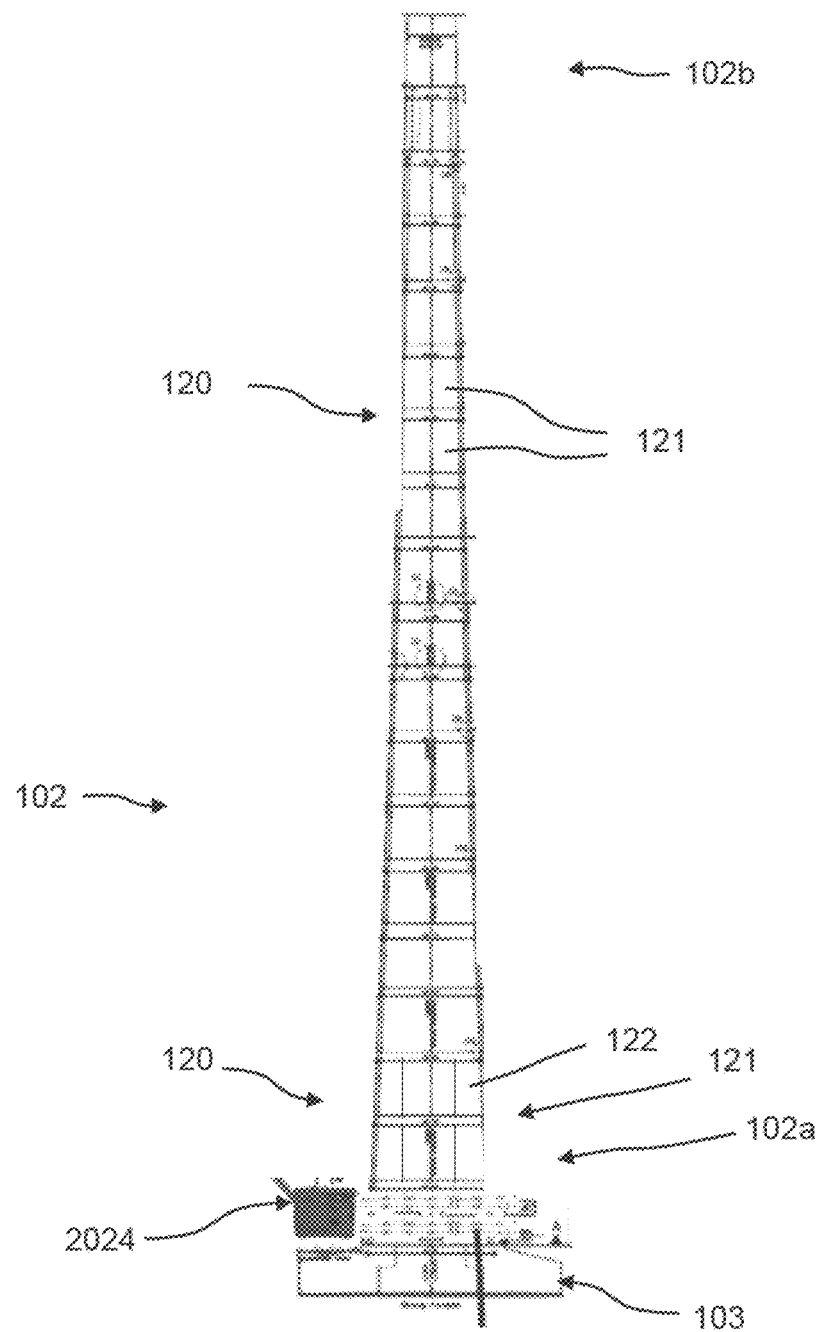
FIG. 30 shows a schematic longitudinal section of a tower having an exemplary tower-based demolition tool.
Figure 31:
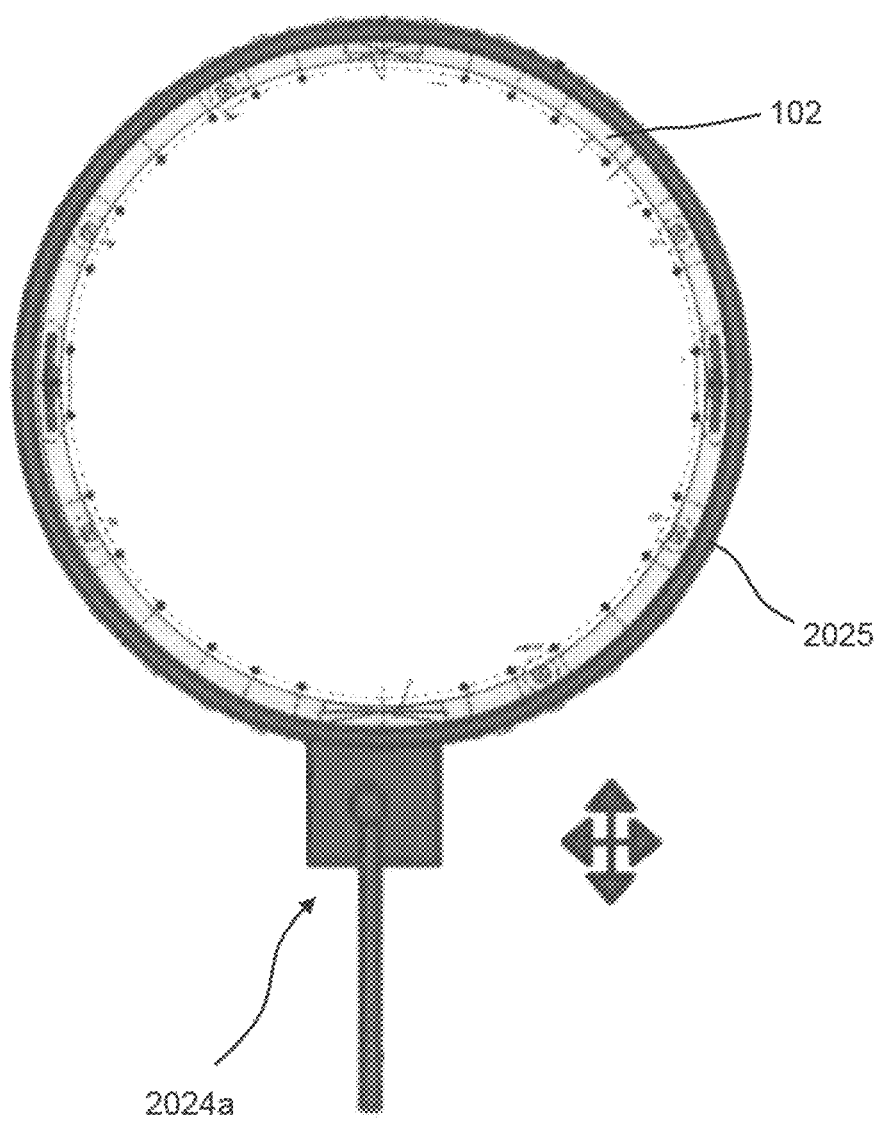
FIG. 31 shows a schematic sectional illustration of a tower having a further exemplary tower-based demolition tool.
Figure 32:
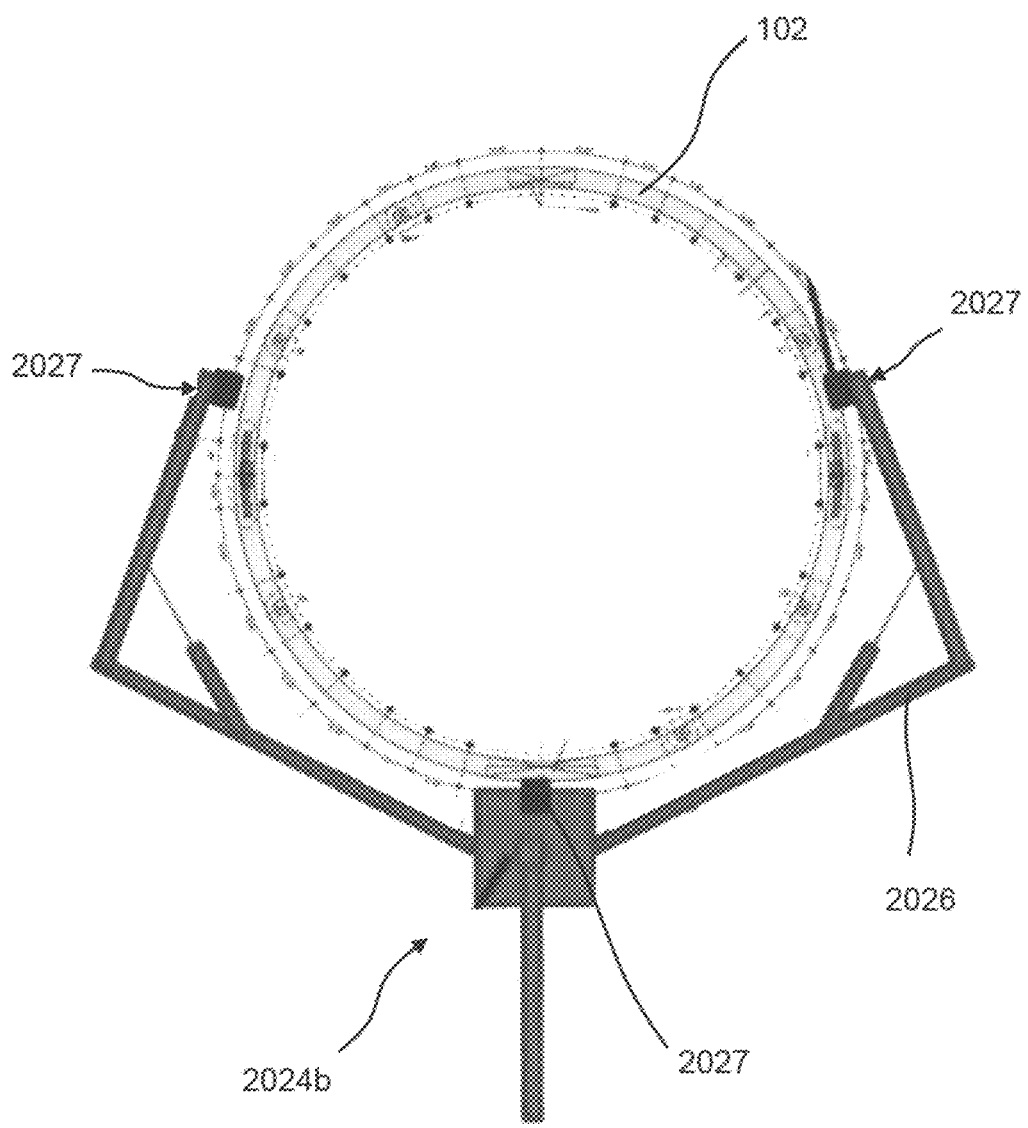
FIG. 32 shows a schematic sectional illustration of a tower having a further exemplary tower-based demolition tool.

The tower-based demolition tool preferably follows the tower 102 along the vertical axis of the latter, preferably in a self-acting manner. An example to this end is shown in FIGS. 30 to 32. In the variant as per FIG. 31 the tower-based demolition tool 2024a has approximately two, or a plurality of, chains or cables 2025 which are placed about the circumference of the tower, which by means of a device are tensioned about the circumference of the tower 102 and are released in an alternating manner, and relocated in the vertical axis of the tower 102. As a result of such alternating bracing, the tower-based demolition tool 2024a holds its position on the existing tower 102 preferably by means of a friction-fit and/or a form-fit (in particular by virtue of the conical construction shape of the tower 102) and as a result of the second cable 2025, which is relocatable in the vertical axis, the tower-based demolition tool 2024a can move upward on the tower 102.

In the variant as per FIG. 32 the tower-based demolition tool 2024b has a steel construction 2026 having a mounting. Drives 2027 which are impinged with a corresponding contact pressure and follow the contour of the tower 102 are provided here. The three-point mounting here encompasses the circumference of the tower 102 to an extent of more than 180°, as can be seen in FIG. 32.

A tower-based demolition tool 2024, 2024a, 2024b at the beginning of the disassembly works thus preferably moves from the tower base 102a (FIG. 30) up to the upper rim 102b of the tower 102 and from there begins the comminution of the tower segments 120, for example by means of demolition shears 2015 or a chisel 2022.

In the next step 264, the tower 102 by way of the demolition shears 2015 or, for example, a chisel 2022, is subtracted piece by piece from the top to the bottom. In a step 265, the rubble accumulating in the interior of the tower can subsequently be removed, conjointly with the lower tower end, using an excavator on the ground. Here too, the rubble in a last step 266 is separated on the ground so as to be able to be recycled or disposed of, and transported away.

Figure 10:
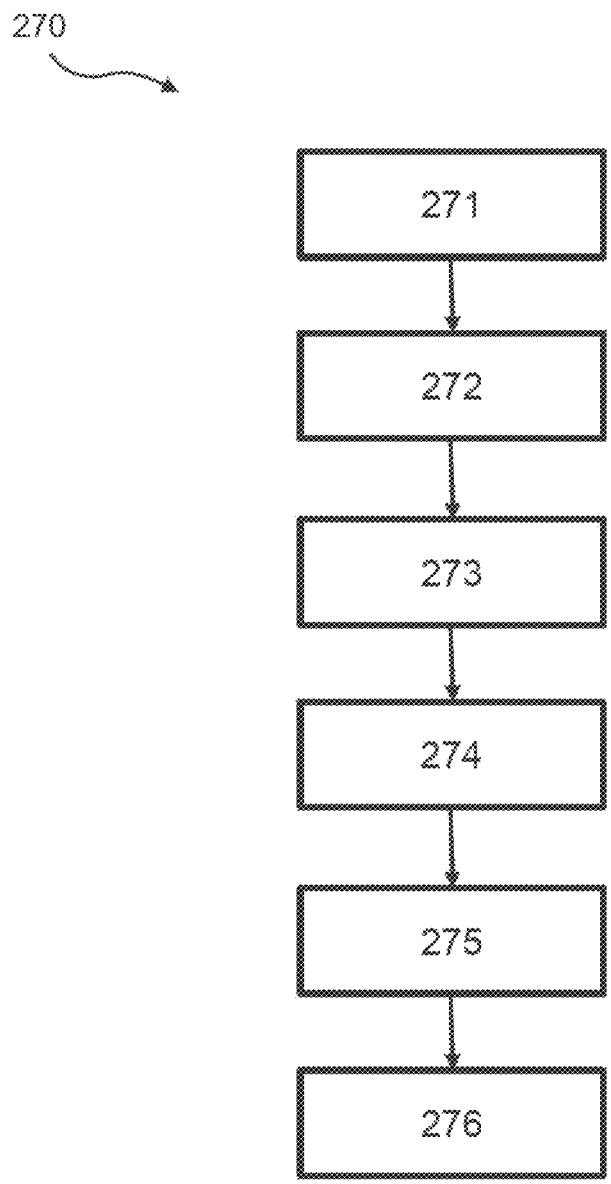
FIG. 10 shows a schematic flowchart of a further exemplary embodiment of steps of a method for disassembling a tower of a wind power plant.

A schematic flowchart of a further exemplary embodiment of steps of a method 270 for disassembling a tower 102 of a wind power plant 100 using thermal separation, in particular using an oxygen lance, is illustrated in FIG. 10. The method 270 described here likewise enables a deconstruction in segments in which entire segments 120 are lifted from the tower 102 and is furthermore particularly also suitable for towers 102 having internally guided tendons.

This method 270 can be used in particular in locations with the following conditions: open location, for example meadows or fields; location with utility lines such as, for example, gas lines, in the immediate vicinity; location with limitations as a result of denial of use of neighboring properties; water-proximal location, for example with ditches, waterways, lakes in the immediate vicinity. This method 260 can furthermore particularly be used in towers of the following type: prefabricated concrete tower having internally guided tendons and joints which are connected in a materially integral manner, in particular adhesively bonded; prefabricated concrete tower having internally guided tendons and dry joints, in particular system joints; prefabricated concrete tower having externally guided tendons and having joints which are connected in a materially integral manner, in particular adhesively bonded. With some limitations this method 260 is suitable for drinking water protection zones. With some restrictions this method 260 is likewise suitable for site-cast concrete towers.

Here too, in a first step 271, the installed parts of the tower 102, with the exception of the access ladder and the lightning protection connection which remain in the tower for safety reasons, are to be removed prior to the disassembly.

Figure 33:
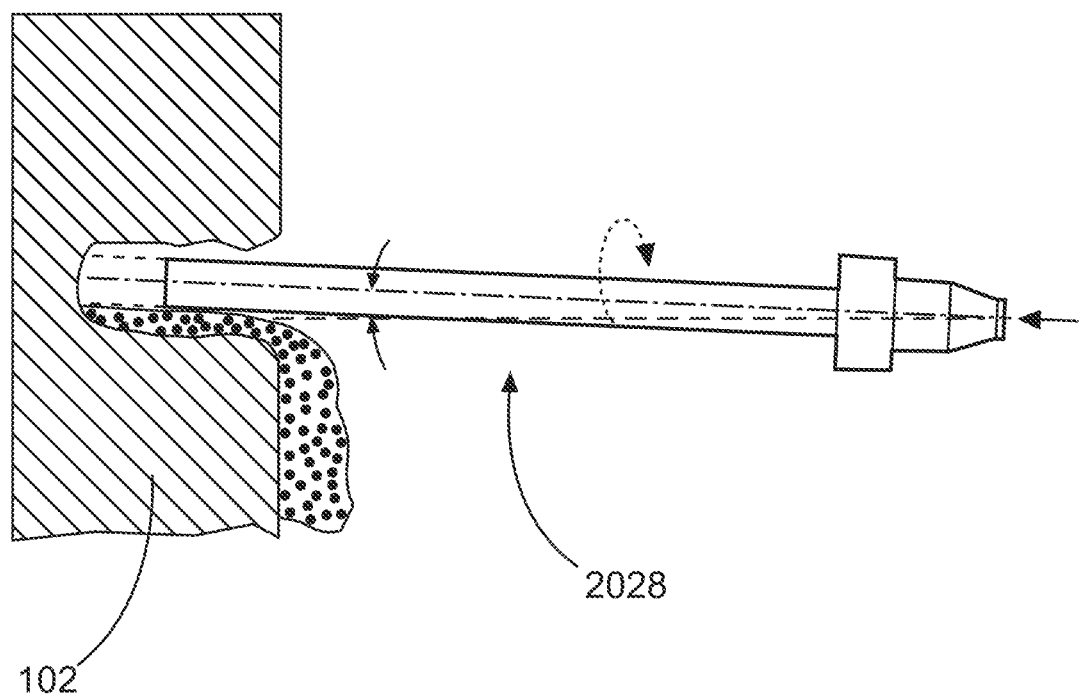
FIG. 33 shows a schematic three-dimensional view of the upper end of a tower when using an exemplary oxygen lance.
Figure 34:
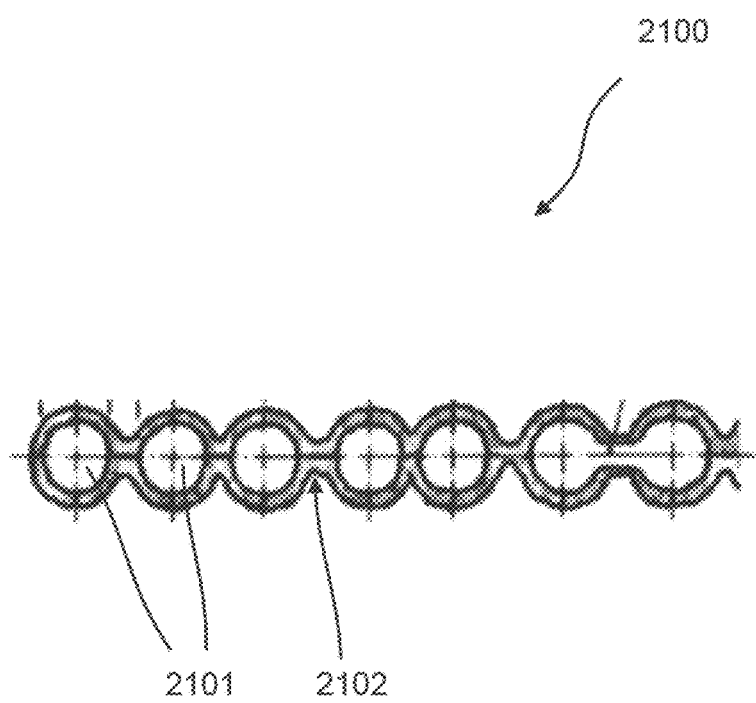
FIG. 34 shows a schematic sectional illustration of an exemplary separating perforation.

In a step 272, a work platform is preferably provided at the upper end of the tower. This work platform preferably travels further downward as the disassembly of the tower progresses and the height of the tower thus decreases. In a step 273, a thermal separation of the internally guided tendons is carried out, preferably from this work platform, for example by means of an oxygen lance 2028 (FIG. 33). In most instances, no progressive cutting procedure takes place here, but the individual tendons are separated by a plurality of drill holes, wherein the plurality of drill holes when lined up form a separating perforation 2100 (FIG. 34). The webs 2102 that remain between the drill holes 2101 in the case of mineral materials have a brittle glass structure and are easy to separate.

In a further step 274, the respective uppermost tower segment 120o, in particular once the latter has been severed to the extent of approximately ⅔, is lashed to a disassembly crane. In a further step 275, a, preferably hydraulic, splitting apparatus 2029 (FIG. 35) by way of which the uppermost segment 120o is severed from the underlying segment is then severed.

In a further step 276, the uppermost segment 120o is lifted by the crane and deposited on a storage surface close to the tower, for example. Any connections which are potentially still present at vertical interfaces between sub-segments 122 can also be released on the ground.

Steps 273 to 276 are repeated according to the number of segments 120 to be disassembled.

Figure 11:
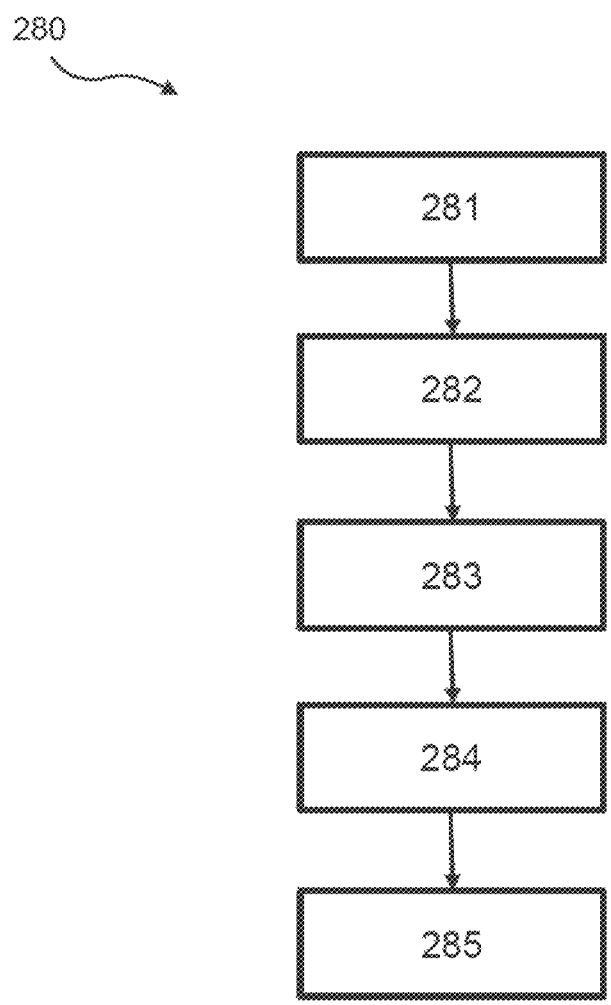
FIG. 11 shows a schematic flowchart of a further exemplary embodiment of steps of a method for disassembling a tower of a wind power plant.

A schematic flowchart of a further exemplary embodiment of steps of a method 280 for disassembling the tower 102 of a wind power plant 100 using high-pressure water jet cutting is illustrated in FIG. 11. The method 280 described here likewise enables a deconstruction in segments, in which entire segments 120 are lifted from the tower 102, and is furthermore particularly suitable also for towers 102 having internally guided tendons.

This method 280 can be used in particular in locations with the following conditions: open location, for example meadows or fields; dyke location; location with utility lines such as, for example, gas lines, in the immediate vicinity. This method 280 can furthermore particularly be used in towers of the following type: prefabricated concrete tower having internally guided tendons and having joints which are connected in a materially integral manner, in particular adhesively bonded; prefabricated concrete tower having internally guided tendons and dry joints, in particular system joints; prefabricated concrete tower having externally guided tendons and having joints which are connected in a materially integral manner, in particular adhesively bonded. With some limitations this method 280 is suitable in locations having the following conditions: nature reserve; mountainous location. With some limitations this method 280 is likewise suitable for site-cast concrete towers.

Here too, in a first step 281, the installed parts of the tower 102, with the exception of the access ladder and the lightning protection connection which remain in the tower for safety reasons, are to be removed prior to the disassembly.

Figure 28:
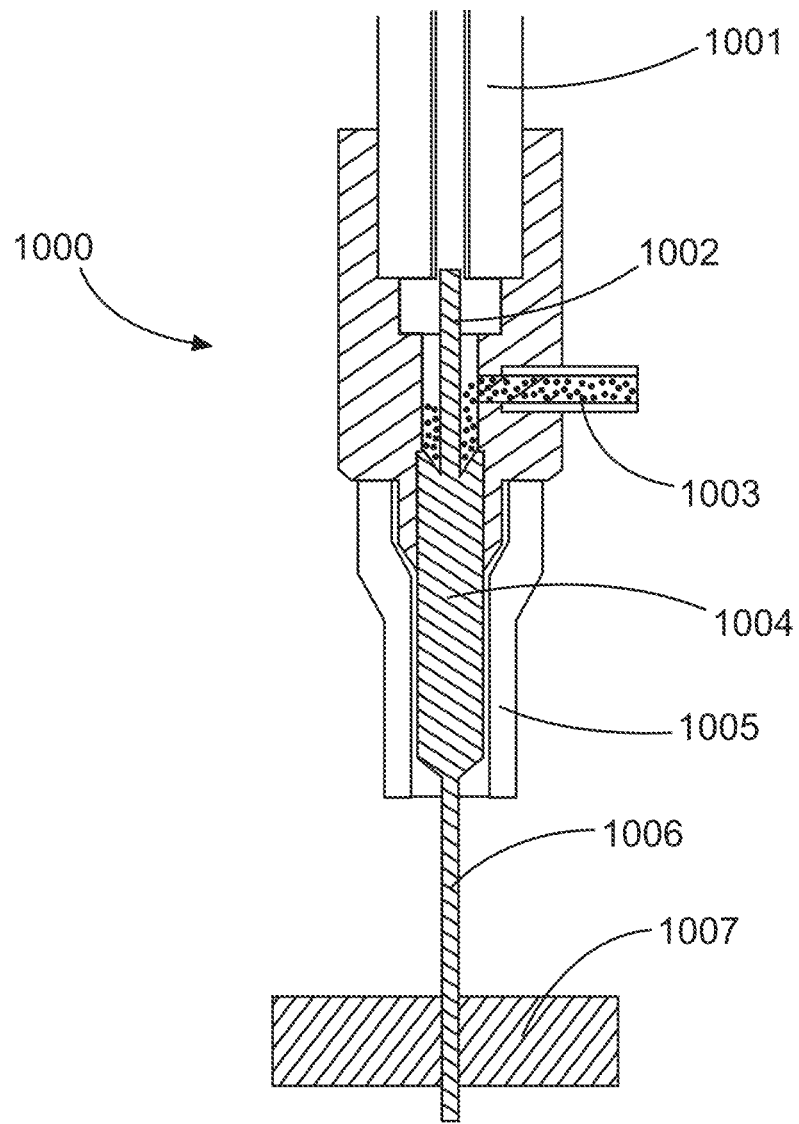
FIG. 28 shows a schematic sectional illustration of an exemplary nozzle system when cutting with a high-pressure water jet using abrasive materials.

In a step 282, a work platform is preferably provided at the upper end of the tower. This work platform preferably travels further downward as the disassembly of the tower progresses and the height of the tower thus decreases. In a step 283, a separation of the internally guided tendons takes place by means of high-pressure water jet cutting, preferably from this work platform. A schematic diagram of the nozzle system when high-pressure water jet cutting using abrasive materials is illustrated in FIG. 28. The highly pressurized water is identified by the reference sign 1001, while the clean water nozzle is identified by the reference sign 1002. The abrasive materials are supplied to the abrasive focus nozzle 1004 by way of the supply line 1003. The cutting jet 1006 exceeds the nozzle system 1000 at the guide 1005 and impacts the material 1007 to be cut, the latter being penetrated by the cutting jet 1006.

In a further step 284, the respective uppermost tower segment 120o, in particular once the latter has been severed to the extent of approximately ⅔, is lashed to a disassembly crane and then completely severed.

In a further step 285, the uppermost segment 120o is then lifted by the crane and deposited on a storage surface close to the tower, for example. Any connections which are potentially still present at vertical interfaces between sub-segments 122 can also be released on the ground.

Steps 283 to 285 are repeated according to the number of segments 120 to be disassembled.

Figure 12:
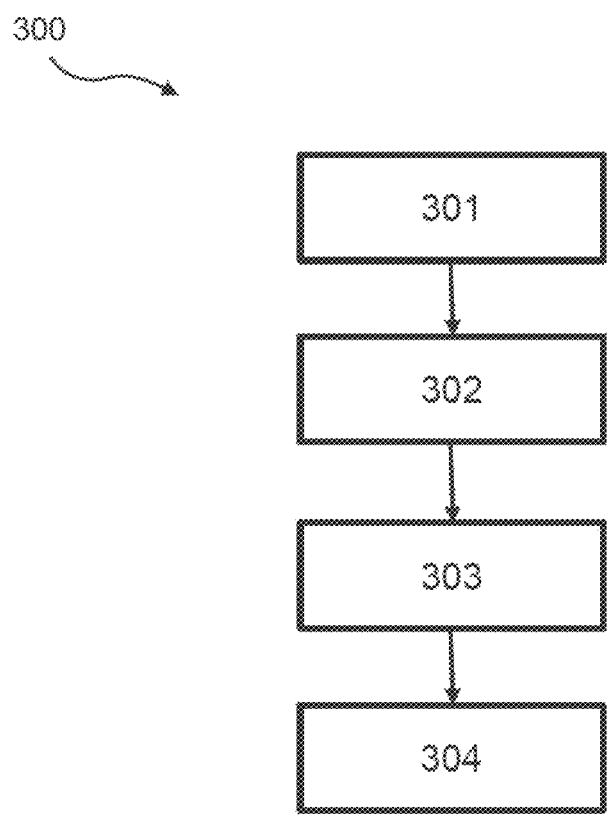
FIG. 12 shows a schematic flowchart of a further exemplary embodiment of steps of a method for disassembling a tower of a wind power plant.

A schematic flowchart of a further exemplary embodiment of steps of a method 300 for disassembling a foundation of a tower 102 of a wind power plant 100 is illustrated in FIG. 12. Disassembling a foundation 103 of a wind power plant 100 is typically required only when no reconstruction of a plant of identical or similar construction is envisaged at the location, the foundation 103 potentially being able to be reutilized in this reconstruction. In the case of reuse, the foundation surface would be cleaned by means of high-pressure water jet methods and optionally, while compressing the tendons, the connection between the tendon and the foundation would be released with the aid of core drilling, the tendons extracted from the foundation, and the casing tubes in the foundation cleaned.

When the foundation 103 can the longer be utilized, the latter can be fully or partially disassembled or deconstructed, respectively, optionally down to a specific depth. Here too, the specific measures for disassembling the foundation 103 are preferably individually established depending on the characteristics of the foundation 103 and the location, as has been described at the outset.

In a first step 301 the foundation 103 is externally exposed, and the foundation cover is removed. In a step 302 the foundation 103 is preferably comminuted, for example by means of a demolition excavator having demolition shears or a chisel, or by detonating for the purpose of loosening. In the variant using a demolition excavator it is preferable for the demolition excavator to be able to travel about the foundation 103 in an encircling manner.

In the variant of comminuting by detonating for the purpose of loosening, a plurality of drill holes, preferably in a grid pattern, are incorporated in the foundation. The grid pattern of the drill holes is in particular a function of the size of the foundation, the extent of reinforcement and the strength of the concrete. An explosive is incorporated in these drill holes, and the foundation is covered again, for example with plaster mats and soil. Once the explosive has been ignited, the cover is removed again and the foundation 103 is exposed. As a result of the detonation, the concrete is largely released from the reinforcement and can be conveyed out of the pit by means of excavators.

In a further step 304, the rubble is separated on the ground so as to be able to be recycled or disposed of, and transported away.

This method 300 in the variant having a demolition excavator and demolition shears can be used in particular in locations with the following conditions: open location, for example meadows or fields; forest location with limited available space; dyke location; location with utility lines such as, for example, gas lines, in the immediate vicinity; location with limitations as a result of denial of use of neighboring properties; nature reserve; drinking water protection zone; location with adjacent buildings; water-proximal location, for example with ditches, waterways, lakes in the immediate vicinity; mountainous location. This method 300 in the variant with detonating for the purpose of loosening can be used in particular in locations with the following conditions: open location, for example meadows or fields; forest location with limited available space; location with limitations as a result of denial of use of neighboring properties; drinking water protection zone; mountainous location. This method 300 in the variant with a demolition excavator and demolition shears, and in the variant with detonating for the purpose of loosening, can furthermore be used so as to be fundamentally independent of the type of the (remaining part) of the tower, thus in particular in towers of the following type: site-cast concrete tower; prefabricated concrete tower having internally guided tendons and having joints which are connected in a materially integral manner; prefabricated concrete tower having internally guided tendons and dry joints, in particular system joints; prefabricated concrete tower having externally guided tendons and having joints which are connected in a materially integral manner, in particular adhesively bonded; prefabricated concrete tower having externally guided tendons and having dry joints, in particular system joints.

The invention claimed is:

1. A method for disassembling a tower of a wind power plant, the method comprising:

selecting disassembly measures as a function of a location of the tower and characteristics of the tower;
preparing the disassembly of the tower;
separating tendons, wherein separating the tendons comprises:
  relaxing externally guided tendons;
  separating externally guided tendons at a top of the tower or on the base of the tower; and
  removing and winding the externally guided tendons using a drum-reeling apparatus;
carrying out the disassembly of the tower;
transporting the disassembled tower away; and
removing coatings on the tower using one or more components from a list comprising a high-pressure water jet, an abrading installation, and a suction installation.

2. The method as claimed in claim 1, wherein the tower comprises a foundation.

3. The method as claimed in claim 1, wherein the tower comprises at least prefabricated concrete units or site-cast concrete units.

4. The method as claimed in claim 1, wherein the tower is prestressed by at least externally guided tendons or internally guided tendons.

5. The method as claimed in claim 1, wherein adjacent tower segments are fully or partially connected to each other in at least one of a materially integral matter, a form-fitting matter, or a force-fitting manner.

6. The method as claimed in claim 1, wherein the method is performed at a location from a list comprising:
  in meadows or fields;
  forest location with limited available space;
  dyke location;
  location with utility lines in the immediate vicinity;
  location with limitations as a result of denial of use of neighboring properties;
  nature reserve;
  drinking water protection zone;
  location with adjacent buildings;
  water-proximal location that include ditches, waterways, and lakes; and
  mountainous location.

7. The method as claimed in claim 1, comprising:
  removing installed parts in an interior of the tower, and/or
  installing a work platform in the interior of the tower and/or outside the tower; and/or
  separating adjacent tower segments; and/or
  removing an upper tower segment by lashing to a disassembly crane and subsequent lifting, pivoting, and lowering the upper tower segment; and/or
  causing the tower to fall by at least one cutting a notch on base of the tower, or detonating the base of the tower; and/or
  comminuting a plurality tower segments of the tower; and/or
  separating the plurality of comminuted tower segments according to component parts.

8. The method as claimed in claim 1, wherein separating the tendons further comprises:
  separating internally guided tendons by at least one of a thermal method, an oxygen lance, or a high-pressure water jet.

9. The method as claimed in claim 1, further comprising separating adjacent tower segments, wherein separating the adjacent tower segments comprises separating the adjacent tower segments at horizontal joints using one or more devices including:
  a concrete wall saw;
  a pad saw;
  a wire saw;
  an oxygen lance;
  a high-pressure water jet; and
  a splitting apparatus.

10. The method as claimed in claim 1, further comprising separating adjacent tower segments, wherein separating the adjacent tower segments comprises separating the adjacent tower segments at vertical joints by separating screw connections.

11. The method as claimed in comminuting a plurality tower segments of the tower, wherein comminuting the tower segments includes:
  detonating the plurality of tower segments; and/or
  using one or more ground-based demolition tools from a list including a demolition excavator, an impact ball, a cable excavator, and demolition shears; and/or
  using one or more tower-based demolition tools from a list that includes a demolition robot, a walking excavator, and demolition shears.

12. The method as claimed in claim 1, wherein preparing the disassembly of the tower further includes preparing the disassembly of the surroundings.

13. The method as claimed in claim 1, further comprising installing a work platform in an interior of the tower and/or outside the tower, wherein installing the work platform in the interior of the tower and/or outside the tower comprises using a plurality of fastening points that were previously used for assembling the tower.

14. The method as claimed in claim 1, further comprising installing a work platform in an interior of the tower and/or outside the tower, wherein installing the work platform in the interior of the tower and/or outside the tower comprises forming new fastening points in the tower.

* * * * *

UNITED STATES PATENT AND TRADEMARK OFFICE
CERTIFICATE OF CORRECTION

PATENT NO. : 11,988,004 B2
APPLICATION NO. : 17/627109
DATED : May 21, 2024
INVENTOR(S) : Jens Hofmann et al.

Page 1 of 1

It is certified that error appears in the above-identified patent and that said Letters Patent is hereby corrected as shown below:

In the Claims

Column 22, Claim 11, Line 27:
"The method as claimed in comminuting a plurality tower segments of the tower, wherein comminuting the tower segments includes:"
Should read:
--The method as claimed in claim 1, further comprising comminuting a plurality tower segments of the tower, wherein comminuting the tower segments includes:"--.

Signed and Sealed this
Twenty-fourth Day of September, 2024

Katherine Kelly Vidal
*Director of the United States Patent and Trademark Office*